United States Patent [19]

Stoecker et al.

[11] Patent Number: 5,850,511
[45] Date of Patent: Dec. 15, 1998

[54] COMPUTER IMPLEMENTED METHODS AND APPARATUS FOR TESTING A TELECOMMUNICATIONS MANAGEMENT NETWORK (TMN) AGENT

[75] Inventors: Paul Stoecker; Mark D. Smith, both of Port Collins, Colo.

[73] Assignee: Hewlett-Packard Company, Palo Alto, Calif.

[21] Appl. No.: 740,183

[22] Filed: Oct. 28, 1996

[51] Int. Cl.$^6$ ........................................... G06F 11/26
[52] U.S. Cl. ............................. 395/183.14; 395/183.08; 395/704
[58] Field of Search ........................ 395/182.02, 183.01, 395/183.06, 183.19, 200.06, 183.14, 183.08, 704; 364/300

[56] References Cited

U.S. PATENT DOCUMENTS

| | | | |
|---|---|---|---|
| 4,558,413 | 12/1985 | Schmitd et al. | 364/300 |
| 5,537,547 | 7/1996 | Chan et al. | 395/200.6 |
| 5,539,881 | 7/1996 | Hunt et al. | 395/200.6 |

OTHER PUBLICATIONS

Distributed Software Engineering Tools, "GDMO Agent Tester" Summary Sheet (2 pages).
"TMN/FastBench Agent Tester" Summary Sheet (1 page).
"Distributed Management Developer's Reference" HP OpenView Integration Series Book—Apr. 1996.

*Primary Examiner*—Robert W. Beausoliel, Jr.
*Assistant Examiner*—Pierre E. Elisca

[57] ABSTRACT

Methods and apparatus for testing a telecommunications management network (TMN) agent are disclosed. Disclosed apparatus for implementing the methods comprises one or more computer readable storage mediums, and computer readable program code stored in the one or more computer readable storage mediums. A first portion of the computer readable program code comprises code for building an internal containment tree which mirrors the run-time containment tree of a TMN agent, wherein the internal containment tree comprises a number of nodes corresponding to managed objects in a run-time containment tree. A second portion of the code comprises code for generating tests for each node of the internal containment tree. A third portion of the code comprises code for executing the generated tests. By building an internal containment tree which mirrors an agent's run-time containment tree, and storing agent tests in a directory structure which mirrors an agent's run-time containment tree, agent debugging is made easier and more straight-forward.

19 Claims, 24 Drawing Sheets

```
main
    OVmdLoadMDFile
    OVmdGenNameTree
    build_ct_from_file
        GetFirstDoc
        join_lines
        buld_node
        parse_doc
        parse_moc
        find_template
            pr_doc_name
        parse_abbrev
        parse_attr
        parse_val
        locate_nb
            nb_pair
                cmp_label
            mk_head
            add_super_list
                append_list
                label2tree
                add_super_list
            free_gen_list
        ck_unique_abbrev
        moc_abbrev
            ck_unique_abbrev
        var_str_init
        get_attr_type
        pr_tree_value
            mk_head
            pr_tree_val_list
                var_str_append
                pr_type_value
                    pr_val_value
                        var_str_n_append
                    pr_type_value
                    query_asn1_int
                    query_asn1_size
                    include_components
                    var_str_contents
                    var_str_free
                    query_asn1_permit
                        query_asn1_char
        var_str_len
    build_moc_sel_list
        gen_re
    build_ct_from_md
        append_child_ct
        append_md_subtree
            include_moc
                empty_list
            append_child_ct
            moc_abbrev
            gen_naming_string
                label2tree
                pr_valspec
                get_attr_type
                gen_type_string
        delete_child_ct
```

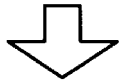

FIG. 5

```
gen_tests
    ckdir
    ckfile
    gen_subtree
        build_pkg_lists
            cond_pkg_included
                cmp_pkg_label
                    freeAsn1Val
        build_attr_list
            append_attr
                find_attr_type
        gen_info
            pr_pkg_contents
                pr_attr_list
                pr_atg_list
                pr_act_list
                pr_ntf_list
        gen_create_test
            pr_moc_oid
            pr_moi
            pr_create_attr_list
                pr_create_attr
                    pr_deftype
                    pr_tree_value
            smf_ntf
        gen_get_test
            pr_moc_oid
            pr_moi
            pr_get_attr_list
            remove_test_file
        gen_set_test
            pr_moc_oid
            pr_moi
            pr_set_attr_list
            smf_ntf
        gen_pkg_groups
            gen_grp_tests
        gen_pkg_actions
            gen_act_tests
        gen_pkg_info
            pr_set_attr_list
            pr_get_attr_list
        free_attr_list
            free
        free_gen_list
        gen_subtree
        pop_list
    build_moc_list
    gen_del_subtree
        gen_delete_test
            pr_moc_oid
            pr_moi
    gen_efd
```

FIG. 6

```
#include <regex.h>         /* regex_t */

/* TREE STRUCTURE */ struct ct_node_struct;
typedef struct ct_node_struct struct ct_node;
struct ct_node_struct {
    ct_node *child;
    ct_node *sibling;
    ct_node *parent;
    OVmdTreeNode *moc;
    char         *abbrev;
    OVmdTreeNode *nb;
    OVmdTreeNode *att;
    char         *val;     /* string, so we can retain specific values
                            *  requested by the user (not just default values
                            *  generated based on the ASN.1 type)
                            */
};

/* LIST STRUCTURES */

/* Generic (or ovat*gen*) linked list header.  Specific list types will be
 * cast to this type for list-manipulation routines.  An empty list is
 * indicated by a NULL "first" pointer.  The "last" pointer is included
 * to make it easier to append an element to a list.
 */
typedef struct gen_list_head {
    void *first;
    void *last;
} gen_list;
```

FIG. 8

```
/* List element types. Each of these should contain a "next" pointer
 * as the first element in order to make use of the common list manipulation
 * routines.
 */
typedef struct moc_nm_struct {
    struct moc_nm_struct *next;
    regex_t *doc_re;   /* NULL indicates no RE specified (matches any) */
    regex_t *moc_re;
} moc_sel;

typedef struct rdn_struct {
    struct rdn_struct *next;
    ct_node *ct;
} rdn_node;

typedef struct attr_list_type {
    struct attr_list_type *next;
    OVmdContainer *doc;
    OVmdAttr *node;
    char *oid;
    int hash;                    /* for faster comparison of oid values */
    OVmdPropertyList *prop;
    char *mod;                   /* Module and ref of ASN.1 type */
    char *ref;
    OVmdTreeNode *type;          /* Pointer to the ASN.1 tree node */
} attr_list_node;

typedef struct pkg_list_type {
    struct pkg_list_type *next;
    OVmdTreeNode *pkg;
} pkg_list_node;
```

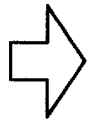

FIG. 9

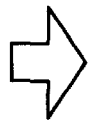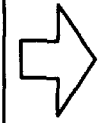

FIG. 10

```
typedef struct moc_tree_type {
        struct moc_tree_type *next;
        OVmdTreeNode *moc;
} moc_list_node;

typedef struct {
        char *head;
        char *tail;
        size_t max;
} var_str;

gen_list *moc_selection_list;
gen_list *mk_head(void);
void append_list(gen_list *list, void *node);
int empty_list(gen_list *head);
gen_list *list_last(gen_list *list);
gen_list *pop_list(gen_list *list, gen_list *old_tail);
void free_gen_list(gen_list *head);
ct_node *build_ct_from_file(char *spec_name);
char *gen_type_string(OVmdTreeNode *asn);
void pr_doc_name(FILE *fd, OVmdTreeNode *doc);
OVmdTreeNode *label2tree(OVmdContainer *doc, OVmdTemplateLabel *label,
        OVmdContainer **new_doc);
ct_node *build_ct(char *spec_name);
ct_node *build_ct_from_md(void);
void pr_tlabel(FILE *fd, OVmdTemplateLabel *tl);
char *moc_abbrev(char *full_moc, ct_node *node);
```

FIG. 11

```
int ck_unique_abbrev(char *new_name, ct_node *node);
void *ckcalloc(int nelem, size_t sz);
void *ckmalloc(size_t sz);
void *ckrealloc(void *old, size_t size);
var_str *var_str_init(void);
void var_str_append(var_str *str, char *suffix);
void var_str_n_append(var_str *str, char *suffix, size_t n);
char *var_str_contents(var_str *str);
int var_str_len(var_str *str);
void var_str_free(var_str *str);
extern int debug;
extern int omit_abbreviation;
extern char *test_dir_name;
extern OVmdHandle *handle;
OVmdTreeNode *get_attr_type(OVmdTreeNode *att);
void pr_valspec(var_str *buf, OVmdContainer *doc, OVmdValueSpecifier *valspec);
int pr_val_value(var_str *p, OVmdAsn1Val *val, OVmdTreeNode *mod,
                 OVmdAsn1Type *type);

void pr_type_value(var_str *p, OVmdAsn1Type *type, OVmdTreeNode *mod,
                   gen_list *subtypes);

void pr_tree_value(var_str *p, OVmdTreeNode *asn);

#define TEMPL_LABEL_LEN 512   /* length of a GDMO template string buffer */
define MAXVALBUF       512   /* max Cstring allowed to be printed */ define NULL_CHAR       '\0' define TRUE  1
define FALSE 0 define INDENT(level) printf( "%*s", (level) * 4, " " )
define FINDENT(fd, level) fprintf(fd, "%*s", (level) * 4, " " )

/* Return results from ckdir() */
#define DIR_OK       0
#define DIR_READONLY 1
```

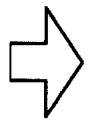

```
Created Jun 18 15:39 by pas
Managed Object Class: "Default Document":passwordRootManagedObjectClass
Via Name Binding: "Default Document":passwordRootNameBinding
With Attribute: "Default Document":passwordRootName Included Packages:
    passwordRootPackage
        Attributes:
            {1 3 6 1 4 1 11 1001 2 9}  --  passwordRootName
        Actions:
            {1 3 6 1 4 1 11 1001 4 1}  --  readObjectsFromDisk
            {1 3 6 1 4 1 11 1001 4 2}  --  writeObjectsToDisk Conditional Packages:
```

FIG. 12

```
CreateArgument {
  -- passwordEntryManagedObjectClass
  managedObjectClass {1 3 6 1 4 1 11 1001 8 1},
  instance managedObjectInstance : distinguishedName : {
    {
      -- passwordRootName
      attributeType {1 3 6 1 4 1 11 1001 2 9},
      attributeValue PasswordFileInfo.PasswordRootSyntax 0
    },
    {
      -- loginName
      attributeType {1 3 6 1 4 1 11 1001 2 1},
      attributeValue PasswordFileInfo.LoginNameSyntax "xxxxx"
    }
  },
  attributeList {
    {
      -- password
      attributeId {1 3 6 1 4 1 11 1001 2 2},
      attributeValue PasswordFileInfo.PasswordSyntax "*"
    },
    {
      -- userID
      attributeId {1 3 6 1 4 1 11 1001 2 3},
      attributeValue PasswordFileInfo.UserIDSyntax -5
    },
    ...
  }
}
```

```
GetArgument {
  -- passwordEntryManagedObjectClass
  baseManagedObjectClass {1 3 6 1 4 1 11 1001 8 1},
  baseManagedObjectInstance distinguishedName : {
    {
      -- passwordRootName
      attributeType {1 3 6 1 4 1 11 1001 2 9},
      attributeValue PasswordFileInfo.PasswordRootSyntax 0
    },
    {
      -- loginName
      attributeType {1 3 6 1 4 1 11 1001 2 1},
      attributeValue PasswordFileInfo.LoginNameSyntax "xxxxx"
    }
  },
  attributeIdList {
    -- password
    {1 3 6 1 4 1 11 1001 2 2},
    -- realName
    {1 3 6 1 4 1 11 1001 2 4},
    -- loginShell
    {1 3 6 1 4 1 11 1001 2 6}
  }
}
```

```
SetArgument {
  -- passwordEntryManagedObjectClass
  baseManagedObjectClass {1 3 6 1 4 1 11 1001 8 1},
  baseManagedObjectInstance distinguishedName : {
    {
      -- passwordRootName
      attributeType {1 3 6 1 4 1 11 1001 2 9},
      attributeValue PasswordFileInfo.PasswordRootSyntax 0
    },
    {
      -- loginName
      attributeType {1 3 6 1 4 1 11 1001 2 1},
      attributeValue PasswordFileInfo.LoginNameSyntax "xxxxx"
    }
  },
  modificationList {
    {
      -- password
      attributeId {1 3 6 1 4 1 11 1001 2 2},
      attributeValue PasswordFileInfo.PasswordSyntax "xxxxxxxx"
    },
    {
      -- realName
      attributeId {1 3 6 1 4 1 11 1001 2 4},
      attributeValue PasswordFileInfo.RealNameSyntax ""
    },
    {
      -- loginShell
      attributeId {1 3 6 1 4 1 11 1001 2 6},
      attributeValue PasswordFileInfo.LoginShellSyntax ""
    }
  }
}
```

FIG. 15

```
GetArgument {
    -- passwordEntryManagedObjectClass
    baseManagedObjectClass {1 3 6 1 4 1 11 1001 8 1},
    baseManagedObjectInstance distinguishedName : {
        {
            -- passwordRootName
            attributeType {1 3 6 1 4 1 11 1001 2 9},
            attributeValue PasswordFileInfo.PasswordRootSyntax 0
        },{
            -- loginName
            attributeType {1 3 6 1 4 1 11 1001 2 1},
            attributeValue PasswordFileInfo.LoginNameSyntax "xxxxx"
        }
    },
    attributeIdList {
        -- passwordEntry
        {1 3 6 1 4 1 11 1001 6 1}
    }
}
```

FIG. 16

```
SetArgument {
-- passwordEntryManagedObjectClass
baseManagedObjectClass {1 3 6 1 4 1 11 1001 8 1},
baseManagedObjectInstance distinguishedName : {
    {
        -- passwordRootName
        attributeType {1 3 6 1 4 1 11 1001 2 9},
        attributeValue PasswordFileInfo.PasswordRootSyntax 0
    },
    {
        -- loginName
        attributeType {1 3 6 1 4 1 11 1001 2 1},
        attributeValue PasswordFileInfo.LoginNameSyntax "xxxxx"
    }
},
modificationList {
    {
        modifyOperator 3,   -- setToDefault
        -- passwordEntry
        attributeId {1 3 6 1 4 1 11 1001 6 1}
    }
}
}
```

FIG. 17

```
ActionArgument {
  -- passwordRootManagedObjectClass
  baseManagedObjectClass {1 3 6 1 4 1 11 1001 8 2},
  baseManagedObjectInstance distinguishedName : {
    {
      {
        -- passwordRootName
        attributeType {1 3 6 1 4 1 11 1001 2 9},
        attributeValue PasswordFileInfo.PasswordRootSyntax 0
      }
    }
  },
  actionInfo {
    -- readObjectsFromDisk
    actionType globalForm: {1 3 6 1 4 1 11 1001 4 1},
    actionInfoArg PasswordFileInfo.FileNameSyntax ""
  }
}
```

FIG. 18

```
-- Conditional Package: "Rec. X.721 | ISO/IEC 10165-2 : 1992": duration
-- modificationList
    {
        {-- startTime
         attributeId {2 9 3 2 7 68},
         attributeValue Attribute-ASN1Module.StartTime 199612312359OO
        },{
        -- stopTime
         attributeId {2 9 3 2 7 69},
         attributeValue Attribute-ASN1Module.StopTime specific: 19961231
        },
    }
-- attributeList
    ,{-- startTime
     {2 9 3 2 7 68},
     -- stopTime
     {2 9 3 2 7 69}
    }
```

FIG. 19

```
modificationList {
    {
        -- password
        attributeId {1 3 6 1 4 1 11 1001 2 2},
        attributeValue PasswordFileInfo.PasswordSyntax "xxxxxxx"
    },
    {
        -- realName
        attributeId {1 3 6 1 4 1 11 1001 2 4},
        attributeValue PasswordFileInfo.RealNameSyntax " "
    },
    {
        -- loginShell
        modifyOperator 2, -- remove
        attributeId {1 3 6 1 4 1 11 1001 2 6},
        attributeValue PasswordFileInfo.LoginShellSyntax " "
    }
}
```

```
attributeIdList {
    -- password
    {1 3 6 1 4 1 11 1001 2 2},
    -- realName
    {1 3 6 1 4 1 11 1001 2 4},
    -- loginShell
    {1 3 6 1 4 1 11 1001 2 6}
}
```

FIG. 22

```
DeleteArgument {
  -- passwordEntryManagedObjectClass
  baseManagedObjectClass {1 3 6 1 4 1 11 1001 8 1},
  baseManagedObjectInstance distinguishedName : {
    {
      -- passwordRootName
      attributeType {1 3 6 1 4 1 11 1001 2 9},
      attributeValue PasswordFileInfo.PasswordRootSyntax 0
    },
    {
      -- loginName
      attributeType {1 3 6 1 4 1 11 1001 2 1},
      attributeValue PasswordFileInfo.LoginNameSyntax "xxxxx"
    }
  }
}
```

FIG. 23

```
CreateArgument {
    -- hpEventForwardingDiscriminator
    managedObjectClass {1 3 6 1 4 1 11 2 2 2 2},
    attributeList {
        -- discriminatorConstruct
        attributeId {2 9 3 2 7 56},
        attributeValue DiscriminatorConstruct or : {
            item : equality : {
                attributeId {2 9 3 2 7 60},
                -- passwordRootManagedObjectClass
                attributeValue ObjectClass {1 3 6 1 4 1 11 1001 8 2}
            },
            item : equality : {
                attributeId {2 9 3 2 7 60},
                -- passwordEntryManagedObjectClass
                attributeValue ObjectClass {1 3 6 1 4 1 11 1001 8 1}
            }
        }
    }
}
```

FIG. 24

```
main
    OVmdLoadMDFile
    OVmdGenNameTree
    build_moc_sel_list
        gen_re
        append_list
    build_ct_from_md
        OVmdGetNTRoot
        append_child_ct
        moc_abbrev
            ck_unique_abbrev
        append_md_subtree
            include_moc
                empty_list
            append_child_ct
            moc_abbrev
            gen_naming_string
                label2tree
                var_str_init
                pr_valspec
                    pr_val_value
                        var_str_append
                        var_str_n_append
                        pr_val_value
                var_str_contents
                get_attr_type
                gen_type_string
                    var_str_init
                    pr_tree_value
                        pr_tree_val_list
                            pr_type_value
                                pr_tree_val_list
                                pr_val_value
                                pr_type_value
                                free_gen_list
                                query_asn1_int
                                var_str_append
                                query_asn1_size
                                include_components
                                query_asn1_permit
                                    query_asn1_char
            delete_child_ct
    print_ct
        print_ct_subtree
            pr_tlabel
```

FIG. 26

```
main
    find_root
    build_name
    load_per
        DTD_set_options
        DTD_deserialize
    initialize_com
        DTD_parse_reset
        DTD_parse
        check_dtd_error
        DTD_encode
        DTD_free
        DTD_size
        DTD_read_str
        bmp_bind
        DTD_unique_string
    efd_startup
        send_file
        receive_file
    main_loop
        get_line
            kbd_read
        parse_test
        parse_args
        send_file
            DTD_parse_reset
            peek_eof
                isasn1comment
            DTD_parse
            get_primitive
            DTD_encode
            DTD_size
            DTD_read_str
            DTD_free
            bmp_send
        receive_file
            bmp_wait
            bmp_receive
            DTD_new
            DTD_decode_US
            DTD_dump
            DTD_free
```

FIG. 27

COMPUTER IMPLEMENTED METHODS AND APPARATUS FOR TESTING A TELECOMMUNICATIONS MANAGEMENT NETWORK (TMN) AGENT

FIELD OF THE INVENTION

This invention pertains to computer implemented methods and apparatus which enable the testing of a telecommunications management network (TMN) agent prior to the development, installation and configuration of a TMN manager. More specifically, the invention pertains to computer software for generating, editing, executing, and evaluating TMN agent tests.

BACKGROUND OF THE INVENTION

TMN standards define a manager/agent paradigm for the hierarchical exchange of management information across a communications network. In the TMN paradigm 200 (FIG. 2), a managing system 202 assumes the role of manager 204, transmits requests 206 to managed systems 210, and receives notifications 208 from managed systems 210. A managed system 210 assumes the role of agent 212, receives and responds to requests 206, 214 from a managing system 202, and emits notifications 208, 216 for the managed objects 220–224 defined in the agent's object model 218.

Since the development and implementation of a communications network 200 depends on the contributions of various persons (e.g., one person may configure a TMN agent 212, another may configure a TMN manager 204, and so on), it is extremely important to define standards for the development, implementation, and operation of such a system.

To this end, ISO (International Standards Organization) has adopted a number of standards governing the exchange of management information over a communications network 200. A first of these standards is GDMO (Guidelines for the Definition of Managed Objects, ITU-T X.722). GDMO is a language used to define a manager/agent interface 218. Using GDMO, one may define managed object classes which represent actual system and network resources (i.e., switches, etc.) to be managed. A managed object class (MOC) specifies all of a managed resource's attributes, actions and notifications. Managed object classes may inherit from more abstract managed object classes, as defined by TMN standards such as X.721 and M.3100. GDMO uses ASN.1 (Abstract Syntax Notation One, ITU-T X.208) to specify the syntax of these various data elements. A collection of GDMO managed object classes and their supporting definitions can be grouped together into a logical entity known as a GDMO document (or GDMO model 218). MOCs are very similar to C++ classes.

An instance of a MOC having its own distinct state information is called a managed object 220–224. A managed object 220 differs from a customary software object in that its access methods are not self-contained. Instead, an agent 212 provides a set of standardized access methods for all of the managed objects 220–224 under its control. These standardized access methods are known as services and are defined by CMIS 226 (Common Management Information Service Definition, ITU-T X.710). Services comprise Create, Get, Set, Action, Notification or Event, and Delete. An agent 212 therefore serves as a communication point for the managed objects 220–224 under its control (and CMIS communications 226 are therefore referred to as manager/agent communications rather than manager/managed object communications).

Managed objects 220–224 are named using a hierarchical naming scheme that can be represented by a tree 300 (FIG. 3). TMN standards refer to this tree as a containment tree since arcs 308, 310 between tree nodes represent a containment relationship. Note that the containment relationship is a relationship between managed objects 220–224, and not managed object classes. Also note that a managed object 302 is contained in only one containing managed object 304, which in turn may be contained in another containing managed object 306, and so on.

FIG. 3 illustrates a simple containment tree 300. The name of each managed object 302–306 in a containment tree 300 is made up of the name of its containing managed object (i.e., its superior), and an attribute value which uniquely identifies the managed object within the scope of the containing managed object. The attribute whose value uniquely identifies a managed object is commonly referred to as a managed object's "naming attribute" or "distinguishing attribute".

The set of possible containment relationships which might be represented in a containment tree 300 is defined in a GDMO model 218 using "name binding" templates. A name binding template defines a single containment relationship between superior and subordinate managed object classes (and therefore provides the name of a superior managed object class, the name of a subordinate managed object class, and the name of an attribute used to distinguish an instance of the subordinate managed object class). A full set of possible containment relationships 402–420 can be represented by a tree called a "naming tree" 400. When a particular path through the naming tree (and possibly a distinguishing attribute) is selected to name a managed object, the managed object becomes part of an agent's containment tree 300. Note that a managed object's name may be derived from one of many paths through a naming tree 400, but that once derived, a managed object's name is represented by only one path through a containment tree 300. Also note that each path through a naming tree 400 begins with a "root", which is a null object class defined by TMN standards.

In developing a TMN agent 212, an agent developer must test his or her agent 212 to determine whether it conforms to its GDMO model 218, appropriately handles test requests, and emits notifications when necessary. Preferably an agent 212 is tested throughout its development. In this manner, it is easier to debug additions and/or changes to the agent 212. However, agent testing is difficult since testing requires that a dual-ended communication channel 226 be established.

In the past, an agent developer has often been faced with the tasks of simultaneously developing both an agent 212 and manager 204, and debugging both simultaneously. However, this makes it very difficult to trace errors to their root cause, since initially, both ends of a communication channel are likely to comprise errors (i.e., both the agent and the manager will have errors).

Some software packages allow for the creation of a "default manager" capable of sending simple test requests to an agent 212. However, these default managers are often incapable of fully exercising an agent 212.

It is therefore a primary object of this invention to provide methods and apparatus which enable the testing of a TMN agent 212 prior to the development, installation and configuration of a TMN manager 204.

It is a further object of this invention to provide methods and apparatus embodied in computer software which enable the generation, editing, execution, and evaluation of TMN agent tests.

It is yet another object of this invention to provide TMN agent testing apparatus which comprises distinct test generation and test execution engines. In this manner, changes to an agent's GDMO model only require the generation of new agent tests, and do not necessitate a recompiling of the test execution engine.

SUMMARY OF THE INVENTION

In the achievement of the foregoing objects, the inventors have devised software methods and apparatus for generating, editing, executing and evaluating TMN agent tests.

A first feature of the software is a test generation engine, ovatgen 108, which reads a GDMO model 102 and automatically generates a suite of tests 110 to exercise an agent 118 conforming to the model 102. In the process, an internal representation of an agent's run-time containment tree (an internal CT tree) is built by the test generation engine. The internal CT tree mirrors an agent's run-time containment tree 228 (FIG. 2).

A generated test suite 110 comprises CMIS requests which perform CMIS services (such as create, get, set and delete) on a MOC instance defined by the GDMO model 102. Default MOC attribute values based on ASN.1 syntax definitions are generated and used by the tests 110.

In addition, a test file "batch list" 112 is generated which contains commands to execute the generated tests 110. The batch list 112 is provided in text form, and may be customized by an agent developer to change the sequence in which tests are executed, add additional tests, change the data values used in one or more tests, or add commands to trigger notifications and the like (perhaps via the editor denoted ovated 114 in the figures).

By default, tests 110 are generated for each MOC of a GDMO document 102. However, tests may be generated for a subset of MOCs by providing the test generation engine 108 with either a MOC selection list 106, or a containment tree specification file (CT spec file 104). A CT spec file 104 allows an agent developer to provide the shape of a containment tree 228 for which tests 110 are to be generated. Specific managed object instance names, the names of directories in which tests for a managed object instance will be stored, a managed object's distinguishing attribute, and even the value of a managed object's distinguishing attribute may be provided in the CT spec file 104.

If desired, a generic CT spec file 104 may be generated using the ovatct 100 component of the software. A CT spec file generated in this manner will be derived from GDMO documents 102, and may comprise default values for MOC distinguishing attributes. The CT spec file 104 may then be edited as would a CT spec file 104 written from scratch.

A MOC selection list 106 merely provides a list of MOCs for which tests 110 are to be generated. However, since a CT spec file 104 provides additional information concerning MOCs (including instance names and their relationships), MOC list files 106 are ignored when a CT spec file 104 is made available to the test generation engine 108.

Generated tests 110 are placed in a directory structure which mirrors the agent containment tree 228 to be created by the tests 110. In this manner, the tests 110 and/or an agent 118 may be debugged with greater ease.

The software also comprises a test execution engine, ovatrun 116, which executes the tests, compares test results 120 with expected results 124, and then generates a report 126 indicating the success or failure of recently executed tests. Provided as an integral part of the test execution engine 116 is a test command language which supports all CMIS service requests (i.e., create, get, set, action, delete, cancel-get), the sending of synchronous or asynchronous requests, the sending of confirmed or unconfirmed requests, automatic or explicit association control, the receiving of events, and system calls.

The test execution engine 116 provides for running tests 110 in interactive or batch mode. By running tests in interactive mode, the success or failure of each test may be monitored, and errors may be immediately diagnosed. Interactive test execution may be used to generate a file of known good test results 120. The known good results 120 may then be copied into an expected results directory 124 using the tool ovatexp 122.

These and other important advantages and objectives of the present invention will be further explained in, or will become apparent from, the accompanying description, drawings and claims.

BRIEF DESCRIPTION OF THE DRAWINGS

An illustrative and presently preferred embodiment of the invention is illustrated in the drawings in which:

FIGS. 5 & 6 illustrates a preferred code flow for implementing the test generation engine, ovatgen, of FIG. 1;

FIGS. 8–11 illustrate a preferred structure for an internal CT tree node;

FIG. 12 illustrates an INFO file generated by the test generation engine of FIGS. 5 & 6;

FIG. 13 illustrates a CreateArgument file generated by the test generation engine of FIGS. 5 & 6;

FIG. 14 illustrates a GetArgument file generated by the test generation engine of FIGS. 5 & 6;

FIG. 15 illustrates a SetArgument file generated by the test generation engine of FIGS. 4 & 6;

FIG. 16 illustrates a group GetArgument file generated by the test generation engine of FIGS. 5 & 6;

FIG. 17 illustrates a group SetArgument file generated by the test generation engine of FIGS. 5 & 6;

FIG. 18 illustrates an ActionArgument file generated by the test generation engine of FIGS. 5 & 6;

FIG. 19 illustrates a Conditional Package file generated by the test generation engine of FIGS. 5 & 6;

FIG. 20 illustrates an attribute modificationList file fragment generated by the test generation engine of FIGS. 5 & 6;

FIG. 21 illustrates a modifyOperator fragment generated by the test execution engine of FIGS. 5 & 6;

FIG. 22 illustrates an attributeList file fragment generated by the test generation engine of FIGS. 5 & 6;

FIG. 23 illustrates a DeleteArgument file generated by the test generation engine of FIGS. 5 & 6;

FIG. 24 illustrates an Event Forwarding Discriminator file generated by the test generation engine of FIGS. 5 & 6;

FIG. 26 illustrates a preferred code flow for implementing the containment tree specification file generator, ovatct, of FIG. 1; and FIG. 27 illustrates a preferred code flow for implementing the test execution engine, ovatrun, of FIG. 1.

DESCRIPTION OF THE PREFERRED EMBODIMENT

Figure 1:
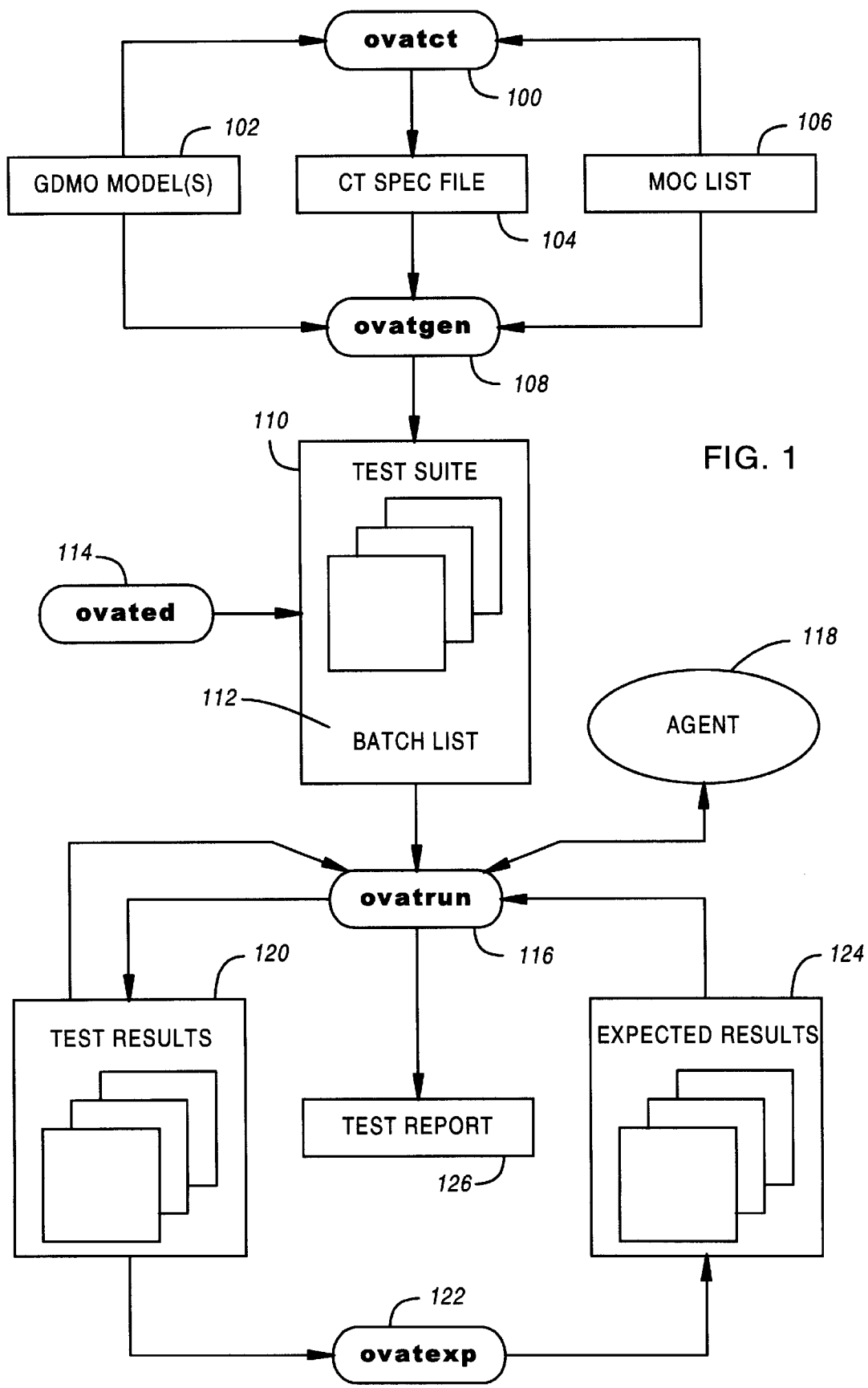
FIG. 1 illustrates the interaction of various software components which provide for generating, editing, executing, and evaluating tests of a TMN agent.

Apparatus for testing a telecommunications management network (TMN) agent is pictured in FIGS. 1, 5, 6, 26 & 27, and may generally comprise one or more computer readable storage mediums, and computer readable program code stored in the one or more computer readable storage mediums. A first portion of the computer readable program code 100, 108 (FIG. 1) may comprise code (FIGS. 5 & 26) for building an internal containment tree 700 (FIG. 7) which mirrors the run-time containment tree 228 (FIG. 2) of a TMN agent 212, wherein the internal containment tree 700 comprises a number of nodes 702, 704 corresponding to managed objects 220, 222 in a run-time containment tree 228. A second portion of the code 108 may comprise code (FIG. 6) for generating tests 110 for each node 702, 704 of the internal containment tree 700. A third portion of the code 116 may comprise code (FIG. 27) for executing the generated tests 110.

Having thus described apparatus for testing a TMN agent in general, the apparatus will now be described in further detail. The following preferred embodiment of agent testing software is specifically designed for compatibility with Hewlett Packard's OpenView Distributed Management Platform. As a result, the "HP OpenView Integration Series Distributed Management Developer's Reference for HP 9000 Series and Sun Systems" (April 1996) is hereby incorporated by reference for all that it discloses (note especially, pages 1-7–1-11, 1-39–1-57, 1-192–1-193, 1-202–1-203, 1-210–1-214, and 1-223 –1-225).

I. Test Generation Engine

In general, the test generation engine 108 of FIG. 1 may comprise two modules, ovatgen and atgen, where ovatgen is a shell script driver for the atgen executable.

The test generation engine 108 may be launched by issuing a command of the following syntax:

ovatgen [-t test_dir] [-f file] [-c file] [-m file] [-p file] [-M moc] [-P moc] [-s string] [-x721] [no-X721] [-a] [-h] [-v] [-w] [-y] [gdmo.mib|gdmo.md . . . ]

Command line options are further defined as follows:

-a

When the -a option is given, test directory names are not abbreviated. By default, test directory names are created by truncating each section of a MOC name to a few characters (MOC names begin with a lowercase character, and an uppercase character begins each section). The -a option bypasses this heuristic and insures the use of full MOC names. However, if optional abbreviation fields are given in a CT spec file 104 (see below), the abbreviation fields take precedence over both truncated and full names.

-c file

The file specified using the -c option is a containment tree specification file (CT spec file 104). The CT spec file 104 specifies for which MOCs tests will be generated, the names of directories in which tests will be placed, and the value of each managed object instance's distinguishing attribute.

-f file

The file specified by the -f option is a document name file. The document name file lists GDMO documents 102 which will serve as the basis for test generation (i.e., the GDMO input), and assigns a document name to each.

-h

The -h option is trivial, and merely prints a help (or usage) message.

-M moc

-P moc

The -M and -P options each provide the name of a single MOC for which tests will be generated. Since a CT spec file 104 provides more detailed information on MOCs to be included in test generation, this option is ignored when the -c option is used.

-m file

-p file

The -m and -p options each provide the name of a MOC list file. The list file provides the names of several MOCs for which tests will be generated. Again, this option is ignored when the -c option is used.

-noX721

When used, neither the minimal or full version of the ITU-T X.721 standard is included in the GDMO input.

-s string

The -s option provides a means of replacing the first line of an INFO file 1200 (FIG. 12; a file which comprises informative user data related to tests in a directory, including information concerning when and by whom the tests were created) in each test directory with the contents of string.

-t test_dir

The -t option provides a means of naming the directory in which generated test files will be saved. The default test directory is the current directory.

-v

The verbose option, -v, causes the name of each test file to be written to stdout as the test is generated.

-w

When the -w option is used, GDMO warnings do not print.

-x721

When used, a full version of the ITU-T X.721 standard is included with the GDMO input.

-y

This option suppresses the printing of unresolved GDMO references.

After the ovatgen command is issued, and if the -c option is not used, the ovatgen module 1) parses command line options, and 2) generates a file 106 (FIG. 1) comprising a list of extended regular expressions referencing all of the MOCs specified by the -M, -m, -P and -p options. In a preferred implementation, all of the list files (including the generated list file, and the list files designated by the -m and -p options) comprise one or more lines conforming to the following syntax:

[<documentName>:]<extended regular expression>

Extended regular expressions are defined in the generally available UNIX regexp( ) library. If the optional document name is missing, all documents comprising the GDMO input 102 are searched for the specified MOC extended regular expression. Extended regular expressions must therefore match the complete MOC name, from beginning to end, and not just a substring of the MOC name. That is, if a ^ is added at the start of the supplied regular expression, and a $ is added to its end, the included contents must comprise a complete MOC name. Comment lines (those beginning with a #) and blank lines in a list file are ignored.

The ovatgen module next parses the document name file following the -f option, and calls ovgdmoparse (an HP OpenView program that compiles GDMO text files into .md metadata files, as described in "HP OpenView Integration Series Distributed Management Developer's Reference for HP 9000 Series and Sun Systems", p.1-7–1-11) and ovmdt (an HP OpenView tool that converts .md files into .per files) in response to each .mib file (i.e., GDMO document) listed in the document name file. Note that a per file is a file of compiled data describing ASN.1 data types.

The -f option allows each of several GDMO documents 102 to be assigned a name and processed together to produce a set of tests 110. The document name file preferably comprises one or more entries (one entry for each GDMO document) of the following syntax:

DOCUMENT_NAME "GDMO document name"
OM_PACKAGE_FILE filename
GDMO_FILES filename {filename . . . }
END The OM_PACKAGE_FILE line is optional, and is included only for compatibility with the HP OpenView Managed Object Toolkit (specifically, the program entitled ovmotccgen, which generates C++ code from a GDMO document). The line is ignored by the ovatgen module.

After the ovatgen module completes the above operations, it calls the atgen executable module. A preferred code flow for the atgen executable is illustrated in FIGS. 5 & 6, and begins with the heading main.

Figure 4:
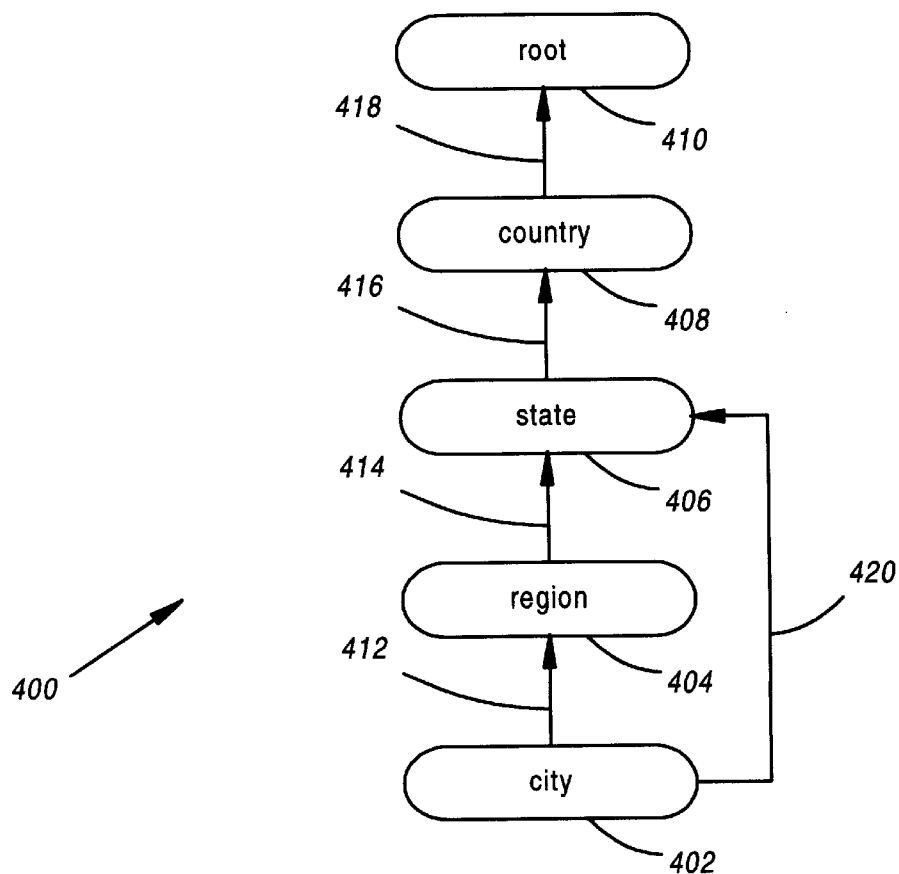
FIG. 4 illustrates a simple naming tree.

Upon launching the atgen executable, ovatgen command line options are once again parsed, and OVmdLoadMDFile (an HP OpenView routine, Id. at 1-210–1-214) is called to load .md files into memory. Thereafter, OVmdGenName-Tree (yet another HP OpenView routine, Id. at 1-192–1-193) is called to generate a naming tree from the loaded .md files (sometimes referred to herein as an OVmd naming tree). Note again that a naming tree 400 (FIG. 4) represents the possible relationships of MOCs, but may not represent the actual names of MOCs since it does not include MOCs listed in an AND SUBCLASSES clause.

Figure 2:
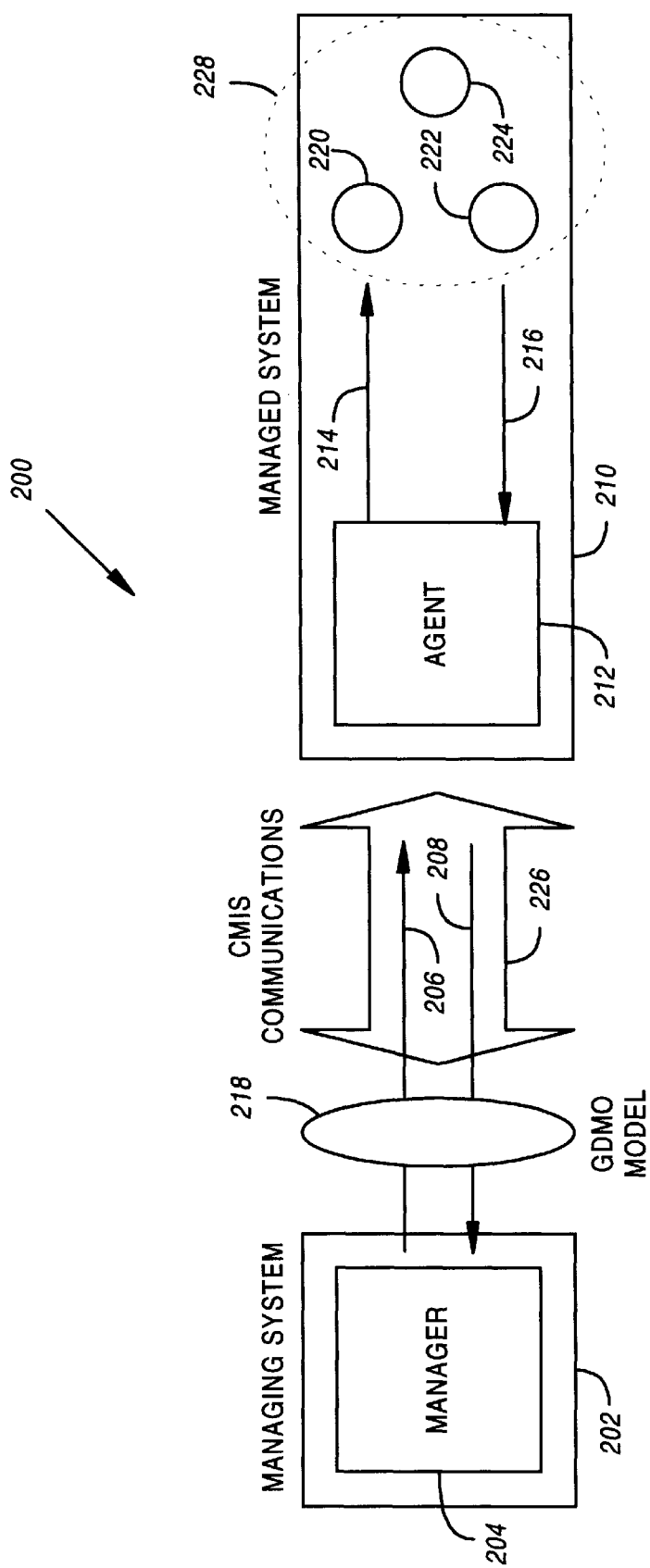
FIG. 2 illustrates the components of a simple telecommunications management network.
Figure 3:
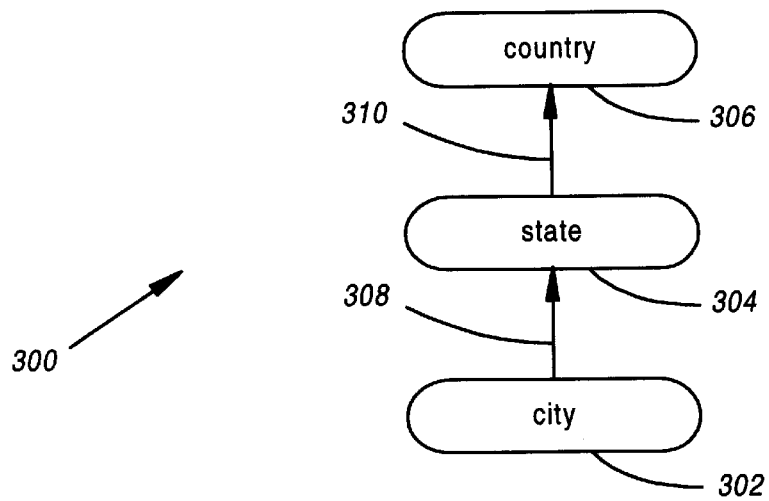
FIG. 3 illustrates a simple TMN agent containment tree.

The atgen module performs two additional tasks, which comprise the heart of the test generation engine 108. First, it builds an internal representation of a TMN agent's containment tree (hereinafter referred to as an "internal CT tree" 700, FIG. 7). Second, it generates and stores network agent tests 110 in a directory structure (preferably a UNIX directory structure) which mirrors the structure of both the internal CT tree 700, and an agent's run-time containment tree 228 (FIG. 2).

Figure 7:
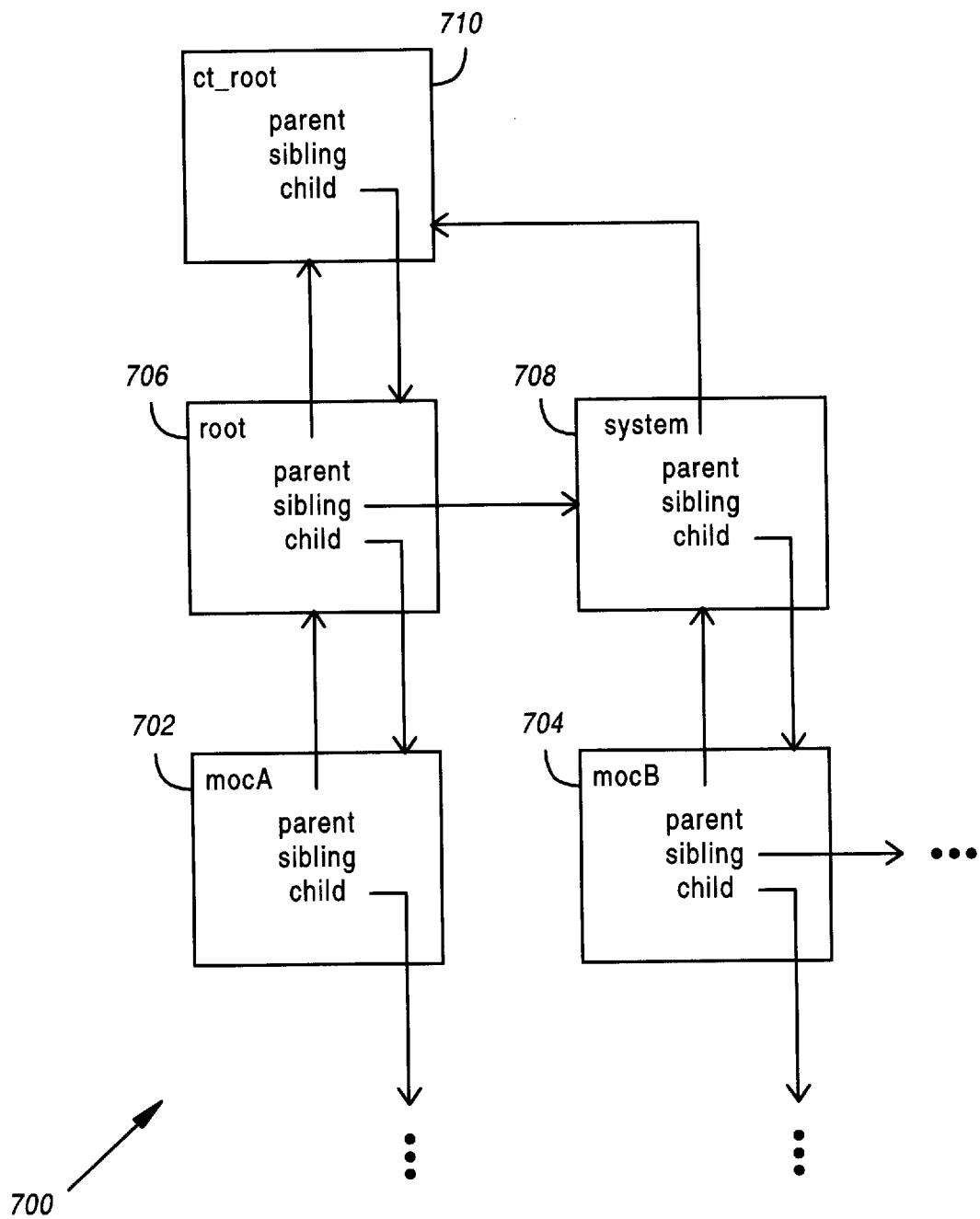
FIG. 7 illustrates the structure of a simple internal containment tree (internal CT tree)

In general, an internal CT tree 700 comprises a number of linked nodes 702–710 wherein each node comprises pointers to other nodes of an internal CT tree 700. A child pointer points to the first of a node's children, a sibling pointer points to the next of a node's siblings, and a parent field points to a node's parent. An exemplary internal CT tree is shown in FIG. 7. The originating node 710 of the internal CT tree 700 is the default node ct_root. Under ct_root 710 are various "separate naming tree" nodes (e.g., "root" 706 or "system" 708). Under the "naming tree" nodes 706, 708 are various levels of nodes 702, 704 referencing actual MOCs to be generated (which may comprise MOCs listed in an AND SUBCLASSES clause). Data pointers stored within each of a tree's nodes point to OVmdTreeNodes (HP OpenView data structures comprising nodes of the naming tree generated by OVmdGenNameTree) for MOC name, name binding, directory name, distinguishing attribute, and distinguishing attribute value. A preferred C++ structure for an internal CT tree node is illustrated in FIGS. 8–11.

The atgen module builds an internal CT tree 700 in one of two ways—either from a user input CT spec file 104 (which provides realistic information concerning the shape and structure of an agent's run-time containment tree 228), or from scratch (using only .md files and the naming tree generated therefrom).

A. Building an Internal CT Tree from a CT Spec File

A preferred C++ program flow for building an internal CT tree 700 from a CT spec file 104 is illustrated in FIG. 5. The code comprises various functions which together comprise the routine build_ct_from_file. The routine is launched when the ovatgen command is issued with the -c option.

A CT spec file 104 provides realistic information concerning the shape and structure of an agent's run-time containment tree 228. To this end, a CT spec file 104 may comprise text in outline form with a format of:

root
\>mocA
\>\>mocA1
\>\>mocA2
\>mocB

In this minimal configuration, there are two MOCs subordinate to the root (mocA and mocB), and two MOCs subordinate to mocA (mocA1 and mocA2). Subordination of MOCs (i.e., a nesting level) is indicated by the number of non-alphanumeric characters preceding a line of text in the CT spec file (e.g., >>). Although the above CT spec file 104 only comprises an outline of MOC names (and this information is mandatory), a line of the CT spec file could comprise additional information provided in the following format:

[>]*MOC_name [(dir_name)] [attr_name] [=val]

where dir_name indicates a directory abbreviation, attr_name indicates a distinguishing attribute, and val indicates an initial value of a specified distinguishing attribute. MOC_name and attr_name may optionally be preceded by a document name followed by a ':' character. All fields are optional but for the MOC_name.

If provided, the CT spec file 104 is parsed, line by line, and a routine is called to determine the name binding between subordinate and superior MOCs comprising immediately adjacent nesting levels in the CT spec file outline. If a proper name binding template is identified, pointers into the OVmd naming tree structure are looked up and recorded in a corresponding node of the internal CT tree 700. The pointers include: 1) a pointer to a distinguishing attribute tree node, 2) a pointer to the distinguishing attribute's initial value, and 3) a pointer to the name of a directory in which to place tests for a particular MOC instance.

The only input to build_ct_from_file is a pointer to the CT spec file 104 specified by ovatgen's -c option, and the only output of build_ct_from_file is a pointer to the internal CT tree 700 it constructs.

Although the build_ct_from_file routine has been generally described above, various functions of the build_ct_from_file routine are described in greater detail below. Note that the following build_ct_from_file functions are recursively called in response to each line of a CT spec file 104.

When starting to build an internal CT tree 700, one or more pointers to the compiled GDMO documents loaded in memory are needed. Preferably, the GDMO documents are compiled in a linked list, such that any document may be accessed once a first of the documents is located. To this end, a function (GetFirstDoc) is provided for OVmdTravTree to call (OVmdTravTree is an HP OpenView routine which traverses linked .md files loaded in memory, Id. at 1-223–1-225), and a pointer to the first document in the linked list is returned. Preferred inputs to the GetFirstDoc function are: handle—an OVmdHandle context (an HP OpenView global pointer); node—a node being traversed; and docNode—user data.

After generating a pointer to the compiled GDMO documents, a function (join_lines) must be provided for reading lines of text comprising a CT spec file 104 (one at a time) into memory (e.g., into a buffer). In the CT spec file disclosed above, the '\' escape character may be used to continue the description of a MOC on a next line of the CT spec file. If such a character is found at the end of a CT spec file line, the character is removed, and an additional line of text is read into the buffer. Upon reaching the end of a line that does not comprise a '\' escape character, program control is returned to the build_ct_from_file routine. Preferred inputs to the join_lines function are: fd—the name of the CT spec file 104 to be read; buf—a buffer into which a line of the CT spec file 104 will be read; line—a CT spec file line to read; and size—the number of bytes remaining in buf.

Having read in a first line of the CT spec file 104, the build_node function allocates a new internal CT tree node (e.g., 702) and attaches it to the internal CT tree 700 an appropriate place. The build_node function does this by reading in the level prefix of a line (i.e., the number of non-alphanumeric characters preceding a line, such as ">>>"). The level prefix indicates a level number that can legally be 0 . . . previous_level+1. If the new level is previous_level+1, build_node attaches a new child node to the node comprising the previous_level. If the new level is <= to the current level, build_node chains up that many levels in the internal CT tree 700 and adds a new sibling node at that level. Inputs to build_node include: buf—a line of the CT spec file 104; line—a line wherein error messages can be written; ct—a pointer to the internal CT tree node (e.g., 706) of the previous_level; level—an indication of the current internal CT tree level; level_tail—a pointer to the first non-alphanumeric character in buf; and skipping—a flag that is set whenever an illegal CT spec file line is encountered (e.g., a CT spec file line nested at a level that is more than one greater than the previous level). The skipping flag remains set until the contents of buf indicate a legal level.

Next, the function parse_doc parses the contents of the buf assembled by build_node and looks for a document name of the form {1 3 6} or "Default Document". If found, the function returns a pointer to the beginning of the document name string, and doc_tail is set to point to the first character following the document name string. If a document name is not found, a NULL indication is returned by setting doc_tail to point to doc_start. Doc_start is a pointer designating where to begin a document name scan in buf. Missing quotes surrounding a document name are not supplied, since that would be ambiguous. However, NLS multibyte characters within the quoted form of a document name are acceptable.

The function parse_moc now scans the buf assembled by build_node, beginning at the point designated by doc_tail, and returns a pointer to the start of a MOC name. Whitespace and/or a ':' character preceding a MOC name are scanned off. The legal characters in a MOC name are [A-Za-z0-9], '-', and '/', and the first character of a MOC name must be a lowercase alphabetic character. Inputs to this function are: moc_start—a pointer designating where to begin a MOC name scan in buf (equivalent to the doc_tail pointer returned by parse_doc); and moc_tail—an argument that will be made to point to the first character following an MOC name. Again, a NULL indication is returned if no MOC name exists.

At this point, the function find_template may be called. Find_template locates an OVmd naming tree node corresponding to a possibly empty document name string, and a MOC name (i.e., a template label), and then returns a pointer to the found template node. If the document name string is empty, all linked .md documents are preferably searched for the MOC name. If the same MOC name appears in several documents, a warning is printed, and the first document found is returned. Inputs to find_template are: doc_ptr—a pointer to the first document tree node (returned by GetFirstDoc); doc—a document name string, either in OID (object ID) or string form; and templt—a template (MOC) name string. If no template is found, a NULL indication is returned.

After locating a template for a CT spec file line, the function pr_doc_name is used to print a document name (in either standard or OID form) into a node of the internal CT tree 700. The inputs to pr_doc_name are merely: fd—the internal CT tree file on which to print; and doc—the specific node of the internal CT tree on which to print.

The function parse_abbrev is now called to look for an optional CT spec file field that specifies an abbreviated directory name for storage of a node's tests. The abbreviation, if present, is identified by the parentheses which surround it. Multi-byte NLS directory names are allowed. Inputs to this function are: buf—the CT spec file line returned by join_lines; abbrev_start—a pointer designating where to begin an abbreviation scan in buf (i.e., the first character following an MOC name); abbrev_tail—a pointer to the first character following an abbreviation (i.e., the first whitespace following the abbreviation's right parentheses); and line—the line number of a current error message line. The function either returns a pointer to the start of the abbreviation, or returns a NULL indication if no abbreviation exists.

A similar function, parse_attr, parses a CT spec file line for a distinguishing attribute field. If whitespace or a ':' character separates the distinguishing attribute field from a preceding document name, these characters are scanned off. If an end-of-line or '=' character is encountered, the optional distinguishing attribute field can be taken to be missing, and a NULL indication may be returned. Otherwise, a pointer to the start of the distinguishing attribute field is returned. Inputs to parse_attr are: attr_start—a pointer designating where to begin an attribute scan in buf; and attr_tail—a pointer to the first character following an attribute field.

The function parse_val searches the contents of buf for a '=' character. If found, everything that follows is identified as a distinguishing attribute value, and a pointer to the beginning of same is returned. The value found will be saved in the internal CT tree 700 and written to test files whenever the initial value of a distinguishing attribute is required in identifying an MOI. The only inputs to parse_val is val_start, a pointer designating where to begin the search for a '=' character in buf. If a value is not found, a NULL indication is returned.

The next function called by build_ct_from_file is locate_nb. For each pair of subordinate/superior MOC tree nodes (e.g., 702/706) in the internal CT tree 700, a name binding template that connects them is located. If AND SUBCLASSES clauses exist within the OVmd naming tree, the template can be a name binding that mentions a superclass (i.e., a MOC from which one of the pair inherits). To locate a name binding template, two lists of superclasses are built, one for each input MOC. After building the lists of superclasses, a name binding list is checked for each cross-product of the lists of superclasses. If the distinguishing attribute of the subordinate class is non-NULL, then a check is made to ensure that the selected name binding names the subordinate classes' distinguishing attribute. An alternative to the above would be to check the name binding lists for each of the two MOCs, and then recursively call locate_nb for the combinations of each MOC and the other's DERIVED FROM list. However, this leads to redundant checking among the cross-products of superclasses. Inputs to this function are: sup—the OVmdTreeNode superior class; sub—the OVmdTreeNode subordinate class; and attr—the OVmdTreeNode for the subordinate classes' distinguishing attribute (if any). The locate_nb function returns a pointer to the OVmdTreeNode for the name binding template connecting the current subordinate/superior MOC tree nodes.

In locating a name binding, locate_nb calls several additional functions. The first of these additional functions is nb_pair. From a pair of MOC tree nodes (and a possible distinguishing attribute), locate_nb determines if there is a name binding which connects them. It does this by following the OVmdlist (an HP OpenView structure) of naming superior classes from the given subordinate MOC. For each of those classes, it checks 1) that it matches the desired superior class, 2) that the name binding references the given attribute, if present, and 3) that if either the sup or sub argument is an ancestor of the original class, that the name binding template allows that with the AND SUBCLASSES clause. Inputs to this function are: sup—a superior class tree node candidate; require_sup—a flag that is set if the AND SUBCLASSES clause must be present on the superior side; sub—a subordinate class tree node candidate; require_sub—a flag that is set if the AND SUBCLASSES clause must be present on the subordinate side; and attr—a distinguishing attribute tree node. If the attr argument is present, it can be used to disambiguate between several name binding templates that connect the same superior and subordinate classes.

A subroutine of nb_pair is cmp_label, which returns TRUE if tree (an OVmdTreeNode pointer) and label (an OVmdTemplateLabel pointer) refer to the same template. This is intended only for GDMO templates (those tree nodes whose parent is a naming tree node). An additional input to this function is ctx, a container context from which the label reference is made. If the tree and label pointers do not refer to the same template, the function returns FALSE.

A second function called by locate_nb is mk_head. This function allocates a generic list header and returns a pointer to it.

A third function called by locate_nb is add_super_list. This function builds a list of all superclasses (those that the given MOC is DERIVED FROM). This list may be used to locate possible matches in a name binding template if an AND SUBCLASSES clause is present. Function inputs are: list—the gen_list (generic list) to append the superclasses to; and moc—the tree node for the MOC in question.

In building a list of superclasses, an append_list function appends a generic node to the list, assuming that whatever node is appended has as its first element a pointer to the next element in the list. Inputs to append_list are: gen_list—a list to append to; and node—a node of the list to append to. A label2tree function uses an OVmdTemplateLabel label, along with a containing document context, to locate the referenced OVmdTreeNode. Inputs to label2tree are: doc—an OVmdContainer context in which the label reference appears; label—an OVmdTemplateLabel contains a document name and an optional document name (in either OID or string form); and new_doc—the returned OVmdContainer context of the document that contains the referenced template. Label2tree returns a pointer to the referenced OVmdTreeNode.

Note that add_super_list may repeatedly call itself to add additional elements to the list of superclasses.

A final function called by locate_nb is free_gen_list. This function merely frees up the generic list created by add_super_list. The list header serves as an input to this function, but note that the list header is not freed.

After a name binding has been located, and if an optional directory name abbreviation has been provided for the current internal CT tree node (e.g., 702), ck_unique_abbrev is called to determine whether the optional directory name is distinct from all previous sibling nodes. Inputs to this function are: new_name—the directory name string to check; and node—a current internal CT tree node whose previous siblings are to be checked for new_name. If no match is found, TRUE is returned. Otherwise, FALSE is returned.

If an optional directory name is not provided for an internal CT tree node (e.g., 702), the function moc_abbrev is called to apply a heuristic which shortens a MOC name (if allowed by an omit_abbreviation flag set in response to whether the ovatgen command is issued with the -a option). The abbreviation heuristic limits the length of each MOC segment in a directory name, where a segment is derived from a MOC name, and is defined as a sequence of lower-case alphanumeric characters following an uppercase character or "-". If the directory name generated is not distinct from all other directory names, successively larger integers are appended to the name, until at some point the name is determined to be distinct from the directory name abbreviations of all of the node's siblings. The ck_unique_abbrev function may be repeatedly called by this function, as needed, to determine the uniqueness of a generated directory name. Inputs to the function are: full_moc—a string representing a full MOC name; and node—the internal containment tree node for this instance.

At this point, and if CT spec file line did not provide a value for the distinguishing name attribute of a MOC, a variable string header (var_str) and initial buffer are allocated by the function var_str_init, and a pointer to same is returned. This structure will be used to obtain an appropriate value for a MOC's distinguishing name attribute.

A first step in providing a value for a distinguishing name attribute is to obtain a pointer to the OVmdTreeNode for the type assignment associated with an attribute. This step is accomplished by the function get_attr_type, which has as its input the variable att, a pointer to an attribute OVmdTreeNode.

After obtaining the type of a distinguishing attribute name, the distinguishing attribute name's value may be generated. Generation of such a value is controlled by the function pr_tree_value, which generates an ASN.1 default value that is appropriate for the given OVmdAsn1TypeAssign tree object. The value string is appended to the string buffer allocated by var_str_init, and is created by collecting subtype specifiers in a list created by calling the function pr_tree_val_list. After the value string is appended to the string buffer, the subtype list is freed. Inputs to this function are: p—a pointer to the string buffer where a value string is to be generated; and asn—an OVmdAsn1TypeAssign tree node for which an appropriate value string is desired.

The list for collecting subtype specifiers is created by allocating a generic list header via the mk_head function, and then returning a pointer to same. Pr_tree_val_list, a routine subordinate to pr_tree_value, then creates a string value appropriate for an ASN.1 type. Pr_tree_val_list is also the recursive entry point for DefinedTypes, where the subtype list construction process is already underway. The function checks to see if a tree node is an appropriate kind, extracts the type and module objects from the node, and then calls pr_type_value. Inputs to the function are: p—a a pointer to the var_str buffer where a value string is to be generated; asn—an OVmdAsn1TypeAssign tree node for which an appropriate value string is desired; subtypes—a gen_list of nodes pointing to the AND of all OVmdAsn1Subt specifiers accumulated so far.

If at any point in the recursive generation process the generic string buffer is determined to be too small, the function var_str_append may be used to append a string to the var_str buffer, expanding the buffer if necessary. Inputs to this function are: str—a var_str buffer; and suffix—the new string contents to append to var_str.

Pr_type_value is a function which generates an ASN.1 default value that is appropriate for a given OVmdAsn1Type object and its containing module. The function then appends the value string to a given string buffer. The function also examines subtype lists (if any). For simple types, the function prints a value appropriate for that type. For example, FALSE for BOOLEAN, 0 for INTEGER, " " for string. For constructed types, this function recursively calls itself for each field of the constructed type. If a subtype specification is present, the function tries to make the value legal (e.g., for INTEGER (–5..5) it might write –5, and for PrintableString (SIZE(4)) it might write "xxxx"). Inputs to this function are: p—the var_str buffer into which the value should be written; type—an OVmdAsn1Type node describing the ASN.1 type; and mod—the OVmdTreeNode for the module that contains the type definition.

In response to pr_type_value, the function pr_val_value prints the value of an OVmdAsn1Val structure. Inputs to the function are: p—the var_str buffer into which to write the value; val—a pointer to the OVmdAsn1Val structure to print; and mod—the OVmdTreeNode pointer to the containing ASN.1 module. The function returns TRUE if a value is successfully printed. If needed, the function calls var_str_n_append to append a string of at most n characters to the var_str buffer into which it is writing a value. The string contents to be appended should be null terminated so that the function knows when to stop appending characters to the buffer. Inputs to the function are: str—the var_str buffer; suffix—new string contents to append to the var_str buffer; and n—the maximum number of characters to allow in suffix.

When called by pr_type_value, the function query_asn1_int returns the value of a numeric ASN.1 value. This routine is used to interpret the values in subtyping constructs. For example, to determine an integer value within the range INTEGER (–5..5), pr_$_{type}$_value calls this routine to extract the –5. Inputs to this function are: val—an OVmdAsn1Val node of the value to be examined; and mod—an OVmdTreeNode of the ASN.1 module containing val (this input is needed in case val is a defined type, in which case a reference lookup must be done).

Query_asn1_size is a routine called to return an integer value of a subtype's size. A SIZE subtype specifier will point to an OVmdAsn1Subt list which defines the possible integer values that are members of the SIZE set. This function traverses the list and returns the value of the first element of which it can make sense. Inputs to the function are: subt—a subtype specifier pointed to by an OVmd_SUBT_SIZE field; and mod—an OVmdTreeNode for the module containing the OVmd_SUBT_SIZE field.

The function include_components may be called as needed to scan the InnerType subtype specifiers (i.e., WITH COMPONENTS . . . ) in a list of subtypes to determine if a particular field of a SET or SEQUENCE should be included. The function builds a parallel list of value specifiers from the InnerTypes, and uses the list to guide value generation if the field is included. Inputs to this function are: subtypes—a gen_list of subtype specifiers that pertain to a containing structure; field—a string label for a field in question; val—a gen_list to which this routine appends a value specifier if one is found within the InnerType (e.g. {. . . field (4..10) PRESENT}). If a SET or SEQUENCE field is to be included in value generation, the function returns TRUE.

The function var_str_contents returns the null-terminated string contents of the var_str buffer. The only input to the function is str, a pointer to the var_str buffer.

After var_str_contents returns the contents of var_str, the var_str_free function frees the space allocated to var_str. The only input to this function is str, a pointer to the var_str buffer to be freed.

If a value needs to be generated from a "FROM" permitted alphabet subtype, the function query_asn1_permit returns such a value. However, this function only returns SingleValue subtype specifiers (otherwise it returns 'x'). Inputs to query_asn1_permit are: subt—an OVmd_SUBT_PERALPHA subtype specifier; and mod—an OVmdTreeNode of the ASN.1 module surrounding the subtype specifier.

Query_asn1_permit may in turn call query_asn1_char to return a character that is one of the OVmd_SUBT_SINGLE values in a permitted alphabet list (i.e., an OVmd_VAL_CSTRING). If a valid character cannot be returned, the function returns 'x'. Inputs to the function are: val—an OVmdAsn1Val value list; and mod—an OVmdTreeNode of the ASN.1 module surrounding the value list.

The final function called by build_ct_from_file is var_str_len, which returns the length of a var_str buffer pointed to by the input str.

B. Building an Internal CT Tree from GDMO Input

In building an internal CT tree 700 from GDMO input 102 (i.e., GDMO documents), the atgen module first builds a MOC selection list 106 (i.e., this function is triggered by the -m, -M, -p and -P options to the ovatgen command). The function build_moc_sel_list therefore opens a file containing a list of regular expressions for MOCs that are to be included in this generation process. Each of the regular expressions is read, compiled, and then saved in a global list entitled moc_selection_list. Note that if a document name is included in the regular expression, and uses the OID form, it should be a fully expanded numeric form (e.g. {1 3 6 1 4 1 11}, not {oidPrefix 11}). The only input to this function is moc_file, the name of a file to open.

The function gen_re is used to generate a compiled regular expression from a string and return a compiled regex_t node (see FIG. 8). The only input needed by this function is pat, a regular expression to be compiled.

The main loop for building an internal CT tree 700 from scratch (i.e., from OVmd naming trees, and possibly a MOC selection list) is entitled build_ct_from_md. A first routine called in this loop is append_child_ct. This routine appends a child node (e.g., 706) to an internal CT tree 700. Inputs to this function are: mom—a parent node in an internal CT tree 700 (possibly a root node, e.g. 710); and kid—a new child node (e.g., 706) to be appended to mom.

The function append_md_subtree is a recursive routine which traverses OVmd naming trees (i.e., those generated by OVmdGenNameTree) and constructs an internal containment tree 700. The routine works on child objects (thereby requiring top level directories (i.e., naming tree roots 706, 708) to be under a placeholder root 710). For each MOC in a naming tree there is an OVmdNameNode that points to all possible superior and subordinate classes of that MOC. This routine follows a linked list of the subordinate classes and attaches a subtree (i.e., a child node) to the internal CT tree 700 for each. In each subtree, the routine records a MOC name, name binding, distinguishing attribute, default attribute value, and a directory name abbreviation (see FIG. 8). Inputs to the function are: ct_parent—a parent node in an internal CT tree 700; md_parent—an OVmdNameNode that contains a list of all name binding arcs from the current MOC, to both superior and subordinate classes.

Include_moc is a function which, for a MOC OVmdTreeNode, determines if the moc_selection_list 106 allows it to be included in the generation process. The function finds a document and MOC label string for a naming tree node in question (e.g., 706), and then searches the global moc_selection_list, calling regexec (a UNIX function) on each compiled expression to evaluate a match. An input to this function is tree_moc, a pointer to an OVmdTreeNode being examined. If an internal CT tree node is to be generated for a particular MOC, the function returns TRUE. Otherwise, it returns FALSE.

Include_moc may in turn call empty_list, a function which merely checks to see whether the moc_selection list 106 is empty. If the list 106 is empty, TRUE is returned, and all MOCs in a naming tree are included in a constructed internal CT tree 700.

Assuming a MOC is to be included in an internal CT tree 700, the function append_child_ct is called. As before, this function appends a new child node (e.g., 702) to an internal CT tree 700. It also chains through an internal CT tree 700 to find the last generated sibling of a new child node, and generates an appropriate sibling pointer for a node. Furthermore, a parent pointer is generated which points back to the new child's parent node.

At this point, a MOC abbreviation is generated by applying a concatenation heuristic. This function is shared with the build_ct_from_file routine.

The function gen_naming_string now attempts to locate any INITIAL VALUEs for a MOC's distinguishing attribute. It does this by chaining through all of a MOC's packages, and all of the attributes within each package, looking for the one that matches what has already been identified as a MOC's distinguishing attribute (from a name binding template). When the attribute is found, its property list is examined, and if there is an appropriate INITIAL VALUE specification, the INITIAL VALUE is used instead of a default type value. However, in most cases, this function defaults to calling gen_type_string for an attribute tree node. Inputs to this function are: moc—a tree node for a MOC; and att_node—a tree node of a distinguishing attribute for the MOC. The function returns a string with a value that will be assigned to a MOC's distinguishing attribute.

Label2tree is called as before to locate a specific naming tree node.

The function pr_valspec prints an ASN.1 value specification into a string buffer. The function only handles OVmdVALUE_REF variants (i.e., OVmd_DERIVATION_RULE points to a behavior template only). Inputs to the function are: buf—a string buffer into which to write; and doc—a GDMO document containing an appropriate value assignment.

The function get_attr_type may be called as before to retrieve the type of a distinguishing attribute.

The function gen_type_string allocates and returns a string that contains an ASN.1 value appropriate for an ASN.1 type assignment made in the given OVmdTreeNode. The only function input is asn, an OVmdAsn1TypeAssign tree node (an HP OpenView structure) for which an appropriate value string is desired.

Finally, if a child subtree (e.g., 702) is appended to an internal CT tree 700, and through an examination of the moc_selection_list 106 it is determined that the MOC identified by the child subtree is not to be included in an internal CT tree 700, the function delete_child_ct may be called to remove the child subtree from the internal CT tree 700. The only input to this function is a pointer to the node to be removed.

C. Generating Tests for Nodes of an Internal CT Tree

After building an internal CT tree 700 (FIG. 7), tests 110 (FIG. 1) must be generated for each node 702, 704 of the tree 700 which is a child of a naming tree root node 706, 708 (i.e., for each managed object). Tests are not generated for the root 710 of the internal CT tree 700 (i.e., ct_root) or nodes 706, 708 which form the roots of various naming trees. Nodes 702, 704 that are children of a naming tree root node 706, 708 are nodes that represent a subordinate class in a name binding and have a distinguishing attribute.

As described below, tests 110 are stored in a directory structure (preferably UNIX-based) which mimics both the internal CT tree 700 and an agent's run-time containment tree 228 (FIG. 2). However, it is preferred that delete tests are not stored in the directories which mimic the internal CT tree 700, but instead, are stored in a separate directory. Delete tests may therefore be appended to the end of a test batch list 112 created by traversing the nodes 710, 706, 702, 708, 704 of an internal CT tree 700. In this manner, a fully populated containment tree 228 may be generated prior to deleting elements 220–224 of the containment tree 228. By storing all other tests (i.e., everything but the delete tests) in a directory structure which mirrors an agent's run-time containment tree 228, the tests 110 (and subsequently an agent 212) may be logically edited and/or debugged.

As each test is generated, its name is written to a test file batch list 112. In this manner, tests 110 may be run in proper sequence by calling the batch list 112, and without having to compile a batch list 112 each time the tests 110 are run. As is explained more fully below, the tests 110 may also be run in an interactive mode, one at a time.

In the flow diagram of FIG. 6, a function for generating network agent tests 110 is denoted gen_tests. When called, the function first traverses an internal CT tree 700 in pre-order, recursively calling the gen_subtree function to generate UNIX subtrees populated with all tests but for delete tests. The function then traverses an internal CT tree 700 in post-order, generating and storing delete tests in a separate delete directory in response to the gen_del_subtree function. Finally, the function calls a function entitled gen_efd to generate an event forwarding discriminator (EFD).

A global name "pathname" and a global pointer "testname" allow directories of "pathname" and files of "testname" to be opened and printed deep within a recursive generation process. Rather than repeatedly passing the "pathname" and "testname" pointers, the passing of a tail pointer allows each iteration through a sibling tree traversal to append a new directory name without having to search backwards in a possibly NLS pathname for a preceeding "/" separator. Furthermore, a new component may be appended to the end of pathname without having to scan the whole name for a null terminator. For example, if the command:

ovatgen -t /users/pas/test_dir was issued, the following pathname and pointers might result:

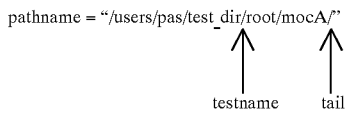

By convention, directory names are always passed with a "/" ending so that test-generating functions may append a test file name to the end of the "pathname" string. Inputs to a test generating function (gen_tests) might be: test_dir—the top name of a test directory to be created; batch_list_file—the name of a batch list file 112 comprising the names of all (or selected) generated tests 110; efd_name—the name of an EFD creation request file; and ct—the name of the root 710 of an internal CT tree 700.

In the FIG. 6 code flow, a first function called by gen_tests is ckdir. This function determines whether the global string "pathname" comprises the name of a valid directory corresponding to a given internal CT tree node (e.g., 702). If a valid directory exists and is writeable, ckdir returns DIR_OK. If a valid directory does not exist, chkdir attempts to create one and return DIR_OK. If a valid directory does not exist, and cannot be created, ckdir returns DIR_NOTMADE. If a directory exists, but is unwriteable, ckdir returns DIR_READONLY. Ckdir is called each time tests are to be generated for a next node of the internal CT tree 700.

After ckdir is called, the function ckfile is called. This function appends a "suffix" input to the global string "pathname" at the location denoted by a "tail" input. It then opens the file and returns a file descriptor. The "tail" input points to the current end of "pathname". The "suffix" input will generally be of the form:

file.req

Ckfile is called each time a new test is to be generated.

Gen_subtree is the main test generator coordinator function. For each node 702, 704 of the internal CT tree traversed, this recursive call sets up the data structures needed by each of the test generating functions, and then calls them. The data structures include lists of all mandatory and conditional packages included in the inheritance hierarchy of the current MOC. Conditional packages tagged with appropriate #pragma OVMOT_COND_PKG* directives (an HP extension to the GDMO language which gives a compiler or other tool additional directions) are included in the mandatory package list. From the mandatory package list, a list of included attributes is created. This attribute list is used by generating functions to create attributeList and modificationList output fields. Inputs to the gen_subtree function include: dir_tail—a pointer to the end of "pathname", where individual test names may be appended by chkfile to generate a fully distinguished test name; tree—a pointer to an internal CT tree 700; and fdn—a list of rdn_nodes comprising a MOC's fully distinguished name (i.e., a record of how a particular point in an internal CT tree 700 was reached).

A first function called by gen_subtree is build_pkg_lists. This function builds lists of all mandatory and conditional packages for a MOC and its superclasses. Inputs to the build_pkg_lists function include: moc_tree—a pointer to an OVmdTreeNode for a MOC in question; pkgs—a header for a list of mandatory packages to be built; and cond—a header for a list of conditional packages to be built.

The function cond_pkg_included is called by build_pkg_lists and returns TRUE if the conditional package named by "label" should be included for a current MOC. The general philosophy followed by cond_pkg_included is to not include a conditional package unless unambiguous instructions include it (not including it means that its attribute and modification lists are written to a separate file, rather than being included in standard test files). For the pragma argument, pkg_label, optional document names are allowed. Inputs to this function include: moc—an OVmdTreeNode for the MOC whose conditional packages are being examined (the #pragmas should be attached to this node); and label—a oVmdTemplateLabel for a conditional package.

Cond_pkg_included in turn calls cmp_pkg_label. This function compares a string that came from a #pragma text with the OVmdTemplateLabel of a package, and returns TRUE if they match. If no document name is present in the #pragma string, it compares only the template labels. Inputs to the function include: name—a pointer to a string containing:

["doc name"]{OID}]: label;

pkg—an OVmdTemplateLabel form of a package name; and moc—a MOC tree node that contains a package reference (to help set the context).

The function freeAsn1Val, which may be called by the function cmp_pkg_label, frees an ASN.1 value structure that may have been allocated to hold an initial, permitted, or required value. The value structure might hold something like "xxxx" to indicate a string of SIZE(4) (i.e., a string that must contain exactly 4 characters). The only input to the function is list, an OVmdAsn1Val pointer (i.e., an HP OpenView pointer to an ASN.1 value).

A second function called by gen_subtree is build_attr_list. This function takes a list of packages and assembles a list of all of their contained attributes. The function's inputs comprise: attr_list—an attribute list header to be filled; and pkg_list—a list of packages.

In response to build_attr_list, and an attribute tree node with associated property list, append_attr 1) creates an attr_list_node, 2) calculates the attr_list_node's OID, hash value, and type, 3) checks that it's not already appended to the list, and 4) if not already appended, appends it to the list. Inputs to the append_attr function are: list—a list of attributes; attr_tree—an OVmdTreeNode for an attribute; and property—a property list associated with an attribute.

In appending an attribute to an attribute list, find_attr_type is called to return the type definition of an attribute (HP OpenView's OvmdDefinedType). The function either locates and returns the WITH ATTRIBUTE SYNTAX reference, or locates the attribute reference by DERIVED FROM, and recursively returns its type. The function places a flag in the object structure to avoid infinite loops. Inputs to find_attr_type are: doc—the GDMO document context for an attribute tree node; and attr_tree—an attribute tree node.

Before tests are generated for an internal CT tree node (e.g., 702), the gen_info function generates an INFO file for a node. This file contains helpful information like who created a test and when (or an alternative message supplied by the -s option of the ovatgen command), a MOC's name, a MOC's distinguishing attribute, and its name binding. The file also lists the contents of a node's mandatory and conditional package lists (OID and labels). An exemplary INFO file is shown in FIG. 12. Inputs to the gen_info function are: tail—a pointer to the current end of a pathname string; ct—a pointer to an internal CT tree node; pkg_list—a list of all mandatory packages for a node (including inherited ones); and cond_list—a list of all conditional packages for a node.

A subroutine of the gen_info function is pr_pkg_contents. This routine prints to a file the attributes, attribute groups, actions, and notifications of each package in a list by recursively calling the functions pr_attr_list, pr_atg_list, pr_act_list, and pr_ntf_list. Inputs to pr_pkg_contents are: fd—a file opened by ckfile in which information will be written; and list—a list of packages.

For each attribute in an OVmdAttributes list, pr_attr_list prints the attribute's OID and label (e.g., "{1 3 6 1 4 1 11 1001 2 9}—passwordRootName"). Inputs to this function are: fd—a file to write; and pkg_doc—an OVmd GDMO document which contains a package containing an attribute list.

Similarly, the function pr_atg_list prints OIDs and labels for attribute groups contained in a package. Inputs to this function are: fd—a file to write; pkg_doc—an OVmd GDMO document which contains a package; and list—an OVmdAttributeGroups list of attribute groups.

The function pr_act_list prints OIDs and labels for actions contained in a package. This function's inputs are therefore: fd—a file to write; pkg_doc—an OVmd GDMO document which contains a package; and list—an OVmdActions list of actions.

Finally, the function pr_ntf_list prints OIDs and labels for notifications contained in a package. Inputs to this function are: fd—a file to write; pkg_doc—an OVmd GDMO document which contains the package; and list—an OVmdNotifications list of notifications.

After generating an INFO file, the function gen_create_test generates a create.req file comprising a CreateArgument test. Typical CreateArgument file contents are shown in FIG. 13. Inputs to this function are: tail—a pointer to the end of "pathname" (where a create.req test name will be appended); moc—an OVmdTreeNode corresponding to a current internal CT tree node's MOC; nb—a Name Binding for a current internal CT tree node (used to fill in the value of the nameBinding attribute); fdn—the FDN of an object instance; and attr_list—a list of attributes built with build_attr_list.

The function gen_create_test comprises the functions pr_moc_oid, pr_moi, and pr_create_attr_list. The first of these functions, pr_moc_oid, prints the OID string of a MOC's REGISTERED AS clause to the create.req file. Inputs to the function are: fd—a create.req file to be written to; and moc_node—an OVmdTreeNode corresponding to a current object instance.

The function pr_moi prints a Managed Object Instance clause to a create.req file. Inputs to pr_moi are: fd—a file to write to; and fdn—a Fully Distinguished Name (FDN) to write (a list of RDNs).

The function pr_create_attr_list prints a CreateArgument attributeList into a file, omitting the distinguishing attribute from the list. Known values are then filled in for ObjectClass and NameBinding attributes inherited from "top". Inputs to this function are: fd—a file to write to; attr_head—a list of attributes in a current object instance; moc—a curent MOC tree node; nb—a name binding tree node; and fdn—a list of RDNs forming a FDN.

The function pr_create_attr_list calls the function pr_create_attr to print a single attribute value in a create test attributeList. If there is an INITIAL VALUE in the property list, that value is printed. If an INITIAL VALUE does not exist, a DEFAULT VALUE is printed (if one exists). If a DEFAULT VALUE does not exist, a REQUIRED VALUE is printed. If a REQUIRED VALUE does not exist, a PERMITTED VALUE is printed. Otherwise, a default value of an appropriate type is printed. Inputs to the function comprise: fd—a file to write to; and attr_ptr—a pointer to a single attr_list_node.

The function pr_deftype may be called by pr_create_attr to write a default ASN.1 type value into a string buffer for a Mod.Type style reference. It does this by finding an appropriate ASN.1 type assignment in a GDMO document and then writing an appropriate value for it. Inputs to this function are: buf—a string buffer to write to; doc—a GDMO document that contains the ASN.1 type assignment for which a default value is needed; and deftype—a Mod.Type reference.

If a default attribute value needs to be generated by pr_create_attr, the value may be generated by calling the function pr_tree_value. This function is shared with the build_ct_from_file routine.

A final function called by gen_create_test is smf_ntf. This function checks to determine whether any of the notifications defined for a MOC are standard System Management Function ones. If so, TRUE is returned so that a calling function may add a "pair" command to the batch_list being generated. Inputs to this function are: moc—a tree node of a MOC; and oid—an OID string against which to compare each notification.

After a create test is generated, a get test is generated via a gen_get_test function. If a list_flag is set, an attributeList containing those attributes that are GETable is included. If the list_flag is not set, the attributeList is left empty (meaning that all attributes will be gotten). A typical get.req test file is shown in FIG. 14. Inputs to this function may comprise: tail—a pointer to the end of "pathname", at which a get.req file name may be appended; moc—a MOC tree node for a current object instance; fdn—the FDN of a current object instance; attr_list—a list of all attributes contained in a current object instance (if list_flag is set, this list will be scanned for those attributes that are permitted to be modified); and list_flag—a flag which allows an attributeList to be written only when the flag is set.

As with the gen_create_test function, gen_get_test calls the pr_moc_oid and pr_moi functions to print a managed object's OID and Managed Object Instance clause to a test file.

The gen_get_test function then calls pr_get_attr_list to print a get test attributeList (e.g., see FIG. 22), including any modifiable attributes that would have been recently changed in a set test. Inputs to the function are: fd—a file to write to; attr_head—a list of attributes to examine; inner_only—a flag that when set (as by the conditional package functions), causes only the attribute elements to be printed, and not the surrounding attributeIdList{ }). If any GETable attributes are found, TRUE is returned. Otherwise, the function returns FALSE and allows a get.req test file for the current internal CT tree node to be removed.

If a get.req test file is to be removed, the function remove_test_file appends the string "suffix" at location 'tail' in "pathname" and removes the identified file, if possible. Inputs to this function are: tail—a current end of the global string "pathname"; and suffix—the name of a test file to be appended to "pathname".

The function gen_set_test now generates a set test (SetArgument) for an internal CT tree node. A typical set.req file appears in FIG. 15. If no modifiable attributes are found for a MOC, the set.req test file is removed. Function inputs comprise: tail—a pointer to the end of "pathname"; moc—an MOC tree node for a particular managed object instance; fdn—the FDN of an object instance; and attr_list—a list of all attributes contained in an object instance. This attribute list will be scanned for those attributes that are permitted to be modified.

Again, the pr_moc_oid and pr_moi functions are called to print a managed object's OID and Managed Object Instance clause into a set test file. Thereafter, pr_set_attr_list is called on to print a modificationList (e.g., see FIG. 20) into the set test file (FIG. 15). The attributes to be modified are derived from the attributes of the previously built attributes list. An attribute is deemed modifiable if any of the keywords REPLACE, GET-REPLACE, ADD, REMOVE, or ADD-REMOVE appear in its package property list, or if a REPLACE-WITH-DEFAULT is given. If the modification type is not REPLACE (which is the default), a modify operator is added to the attribute term of a modificationList, as shown in FIG. 21. Inputs to the pr_set_attr_list functions are: fd—a file to write to; attr_head—a list of attributes to examine; and inner_only—a flag which if set (i.e., by a call from the package generating routine) causes the string "modificationList" and its closing brace not to be included in a set test file. If the inner_only flag is set, the "list fragment" generated by this function may be copied into an already existing list. If a set attribute list is generated, TRUE is returned. Otherwise, FALSE is returned, and a set test for an internal CT tree's current node is removed.

After generating a set test, the smf_ntf function is called once again to determine whether any of the notifications defined for a MOC are standard System Management Function ones. If so, a "pair" command is added to the test batch list 112 being generated.

After generating create, get and set tests, gen_pkg_groups scans a list of packages, and for each attribute group found, invokes gen_grp_tests (i.e., all of the attributes which were set by set.req are now gotten). A flag is passed along which indicates whether to add a group get test to the test batch file. Inputs to this function are: tail—a pointer to the end of "pathname"; moc—an MOC tree node for a current internal CT tree node; fdn—the FDN of a current MOC instance; pkgs—a list of packages to scan for attribute group pointers; and flag—a flag which, if set, causes a group get test to be included in a test batch_list.

Gen_pkg_groups calls gen_grp_tests to generate grouplabel_get.req and grouplabel_set.req tests. If an appropriate flag is set, the attribute group get test is added to a test batch file. Note that attribute group set tests and conditional package tests are preferably not automatically invoked, since some agents are not able to set-to-default an attribute group. Typical attribute group get and group set tests appear in FIGS. 16 & 17. Inputs to this function are the same as the inputs to gen_pkg_groups.

The function gen_pkg_actions now generates an action test. The test is generated by scanning a list of packages and invoking gen_act_tests for each action found. Inputs to this function are: tail—a pointer to the end of "pathname"; moc—an MOC tree node for a current internal CT tree node; fdn—the FDN of a current MOC instance; pkgs—a list of packages to scan for action pointers.

Gen_act_tests is the function which actually generates an action test file. A typical action test file is shown in FIG. 18. Inputs to this function are: tail—a pointer to the end of "pathname"; moc—an MOC tree node for a current internal CT tree node; and fdn—the FDN of a current MOC instance.

After generating action tests, package files are generated via the gen_pkg_info function. For each conditional package in a package list, a modificationList and attributeList that can be copied into a set or get test file is generated. A typical output is shown in FIG. 19. A comma preceding a package name in the form of an ASN.1 comment is appropriate since the lists are designed to be appended to an existing list (if desired). Inputs to this function are: tail—a pointer to the end of "pathname"; and pkgs—a list of conditional packages to scan.

The already described pr_set_attr_list and pr_get_attr_list functions are used to respectively print a modificationList (FIG. 20) and attributeList (FIG. 22) for each conditional package found by gen_pkg_info.

After the above tests and files have been generated, the nodes of the attribute list, along with the OID string that each points to, are freed via a function entitled free_attr_list. The package lists are freed via free_gen_list, a function which is shared with the locate_nb routine.

After a first subdirectory of tests is generated, gen_subtree is called in response to the next node of an internal CT tree 700, and so on. A function entitled pop_list is provided to remove and return the last node (e.g., 704) of an internal CT tree 700 for which tests will be generated. Because a singly-linked generic list of internal CT tree nodes 700–710 has to update a next-to-last "next" pointer before removing a last node in the list, either the entire list has to be scanned for the the next-to-last pointer, or the next-to-last pointer needs to be passed. Since most of the calling routines of gen_subtree append a node, do something recursive, and then pop the node that was appended, it is easiest to save a pointer to the former last element before appending a node. Pop_list then uses this saved pointer to avoid a list search. Inputs to this function are: list—a list of internal CT tree nodes 702–710 from which a last node will be popped; old_tail—a pointer which either points to the new end of a list if the element to which it points is non-NULL, or causes a last element of a list to be popped if it points to a NULL element.

After all tests and files but for delete tests have been generated, a MOC list is built via the function build_moc_list. This function recursively scans an internal CT tree 700 and adds a moc_list_node to a moc_list if it hasn't yet traversed a particular node of the internal CT tree 700. A data pointer in an moc_list_node points directly to an OVmdTreeNode, so comparisons can be done on pointer values. Inputs to this function are: moc_list—a generic list header of a list to be built; and node—a pointer to an internal CT tree 700 to be searched.

After building a MOC list, a function entitled gen_del_subtree generates a delete.req test for each node 702, 704 of an internal CT tree 700. The tests are generated by traversing the nodes of an internal CT tree 700 in post-order (i-e-, from the bottom of an internal CT tree up). Inputs to the function are: dir_tail—a pointer to the end of "pathname"; tree—a pointer to the node of an internal CT tree at which a recursive call is to begin; and fdn—a list of rdn_nodes comprising the FDN preceding a current node in an internal CT tree.

Gen_del_subtree calls gen_delete_test to generate a delete test for a given internal CT tree node (i.e., a Delete-Argument test). A typical delete test file is illustrated in FIG. 23. Inputs to this function are: tail—a pointer to the end of "pathname"; moc—an MOC tree node for a current internal CT tree node; and fdn—the FDN of a current MOC instance.

As previously done, the pr_moc_oid and pr_moi functions are called to print a managed object's OID and Managed Object Instance clause into a delete test file.

Finally, an event forwarding discriminator (EFD) is generated. The function gen_efd generates a CreateRequest argument which when sent to ovead (an HP OpenView program) creates an EFD. The EFD contains a discriminator construct for matches of "ObjectClass" with any of the OIDs of MOCs generated in this test suite. An exemplary EFD.req file appears in FIG. 24. Inputs to this function are: fd—a file descriptor on which to write the EFD.req; and moc_list—a list of moc_list_node's for all MOCs included in the test suite generated.

II. CT Spec File Generator

A. Operation

Figure 25:
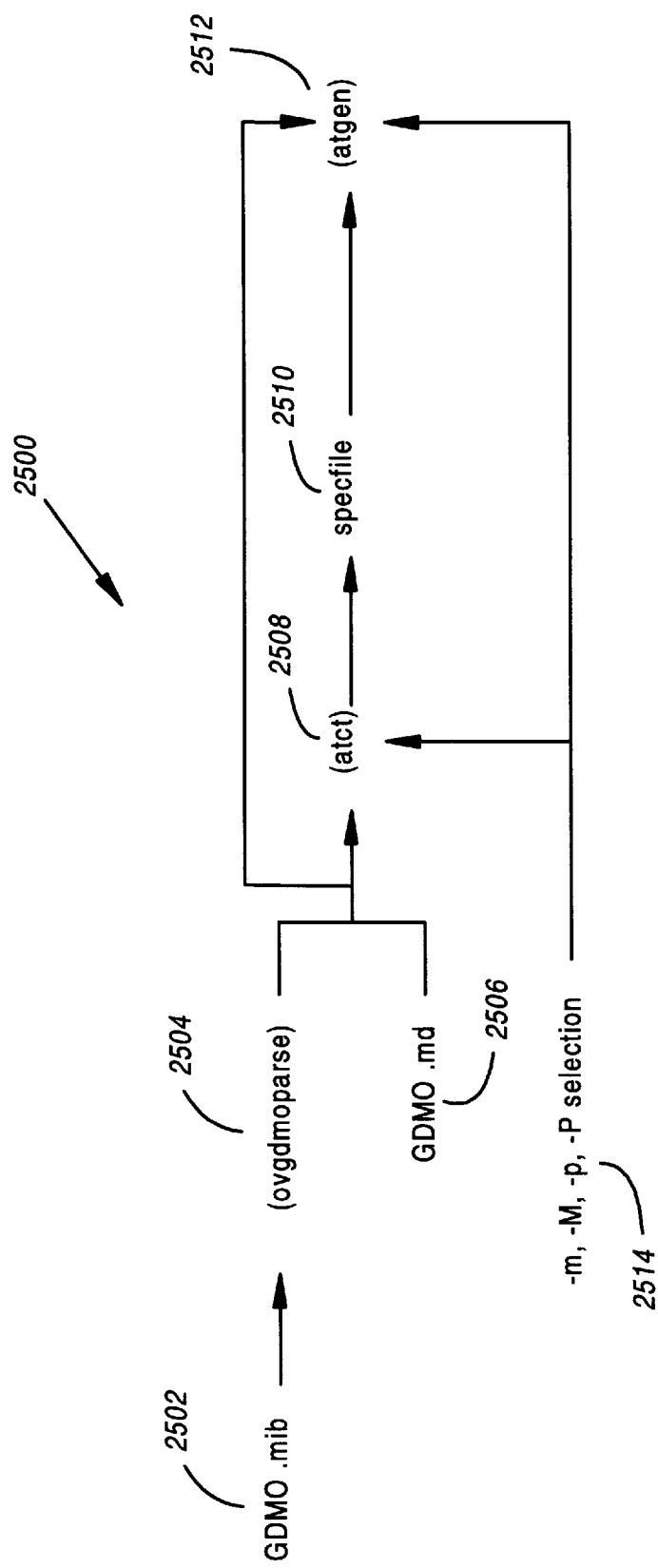
FIG. 25 illustrates inputs to both a containment tree specification file generator, and the test generation engine of FIGS. 5 & 6.

This tool 2500 (FIG. 25) reads input GDMO files 2502–2506 and writes to stdout a template of a CT spec file 2510. This file 2510 may then be customized via a conventional line editor and used as input to the afore-mentioned test generation engine 2512. See FIG. 25. In this manner, a developer has precise control over the testing of his or her TMN agent.

B. Structure

In general, the CT spec file generator 2500 comprises two modules, ovatct 100 and atct 2508. Ovatct 100 is the shell script driver for the atct 2508 executable.

The CT spec file generator may be launched by issuing a command of the following syntax:

ovatct [-f file] [-m file] [-p file] [-M moc] [-P moc] [-x721]
 [-nox721] [-a] [-d] [-i] [-h] [-w] [-y]
 [gdmo.mib|gdmo.md . . . ]

The command line options are similar to those of ovatgen, but for -a, -d and -i. These option are defined as follows:
-a
 If this option is given, test directory name abbreviation fields are not included in the output.
-d
 If this option is given, distinguishing attribute fields are not included in the output.
-i
 If this option is given, distinguishing name attribute initial values are not included in the output.

After the ovatct command is issued, the ovatct module 1) parses command line options, and 2) generates a file comprising a list of extended regular expressions referencing all of the MOCs specified by the -M, -m, -P and -p options 2514.

The ovatgen module next parses the document name file (file) following the -f option, and calls ovgdmoparse and ovmdt in response to each.mib file listed in file.

After the ovatct module completes the above operations, it calls the atct executable module. A preferred code flow for the atct executable is given in FIG. 26, and begins with the heading main.

Upon launching the atct executable, ovatct command line options are parsed once again, and OVmdLoadMDFile is called to load .md files into memory. Thereafter, OVmd-GenNameTree is called to generate a naming tree based on the loaded .md files. Note that the naming tree represents the possible names of MOCs, and not the names of specific managed object instances (and does not include MOCs denoted by the AND SUBCLASSES clause).

The atct module performs three additional tasks, which comprise the heart of the CT spec file generator. First, it builds a MOC selection list (as is done by the test generation engine). Second, it generates an internal CT tree 700 from the constructed OVmd naming tree, and in response to the MOC selection list (similarly to what is done by the test generation engine, and using shared C++ code functions). Third, it writes a CT spec file 104 to a file which may be edited prior to its input into the test generation engine 108. The CT spec file 104 comprises a text outline which mirrors the structure of an agent's containment tree 228 (FIG. 2), thereby making it easy to comprehend and edit.

The various C++ functions which accomplish the first two tasks are shared with the atgen module, and their description will therefore not be repeated. However, note that the calling order for various functions used in the atgen module differs with the calling order of functions in the atct module, as illustrated in FIG. 26. The function OVmdGetNTRoot, which has not yet been discussed, is merely an HP Open-View routine which finds the root of an Ovmd naming tree (see "HP OpenView Integration Series Distributed Management Developer's Reference for HP 9000 Series and Sun Systems" at 1-202–1-203).

The printing of an internal CT tree 700 transforms the tree into a CT spec file 104. Printing of an internal CT tree 700 is accomplished by the routines print_ct, print_ct_subtree, and pr_tlabel. Print_ct handles the top level printing of an internal CT tree 700 (i.e., the printing of internal CT tree nodes 706, 708 at the "naming tree" level—the ct_root node is not printed). Top level printing differs from the printing performed by print_ct_subtree, which recursively handles the printing of all subtrees (i.e., the printing of internal CT tree nodes 702, 704 for which tests will later be generated). The printing of top level nodes 706, 708 needs to be handled differently because naming tree nodes 706, 708 appear as NULL pointers to a MOC, and do not have distinguishing attributes (or initial values) since they never appear as subordinate classes in a name binding template.

Print_ct_subtree performs a prefix traversal of the internal CT tree 700, printing out the contents of each node 702, 704 under the top level. The routine recursively calls itself for each child of a node, and then does the same thing for each sibling of a node. Flags (the -a, -d, and -i options to ovatct) may be used to control whether each of an internal CT tree's optional fields (abbreviation, distinguishing attribute, and initial value) are printed.

Inputs to both print_ct and print_ct_subtree are: out—the file 104 to which an internal CT tree 700 will be written (i.e., the CT spec file 104); node—a current node of an internal CT tree 700; and level—the level of an internal CT tree 700 which is being traversed.

A final routine involved in printing an internal CT tree 700 is pr_tlabel. This routine prints a full template name to the CT spec file 104 (i.e., the document name if present, and a template label). The document name may be either a standard string, or in OID form. Inputs to this routine comprise: fd—the file on which the full template name will be written; and tl—the OVmdTemplateLabel to print.

III. Test Execution Engine

A. Operation

The test execution engine 116 relies on the networking features of Hewlett Packard's commercially available Open-View Distributed Management Platform (which must be installed on the machine from which TMN agent tests 110 are being sent).

Tests 110 may be executed in either interactive or batch mode. In batch mode (non-interactive mode), the order and nature of tests to be executed is determined by a list of commands given in a test batch file 112 (test_dir/batch_list by default). The formats of these commands are illustrated in the following command list.

test [post]

This is the regular test format in which a single request is sent and a single response is expected. The filename containing the request is built by joining the test_dir prefix, the test path, and a ".Req" suffix. If that file is not present, the same filename with a ".req" suffix is sent instead. The ".Req" files are intended to be manually modified versions of the automatically-generated ".req" that will not be overwritten by subsequent invocations of ovatgen. The confirmation is stored in the file result_dir/test.cnf. An expected result file for a confirmation may be named test_dir/test.exp. Any notifications that arrive prior to the confirmation are stored in sequentially numbered files (e.g., result_dir/events/0.ntf, result_dir/events/1.ntf, etc.).

comment

Blank lines and those with "#" as the first non-blank character may be included to document test cases. They are ignored by the test execution engine.

! command

This command causes a subprocess to be invoked during test suite execution. The ! command is useful to coordinate external events with an agent being tested. For example, one could send a signal to the agent that would trigger it to send a notification.

event test [post]

This command causes the test execution engine to wait for receipt of a notification. The received notification is stored in the file result_dir/test.ntf. An expected result file for a notification may be named test_dir/test.ntf_exp. Any pending messages that are not of type "EventReportArgument" are stored in a file in result_dir/test.unk, and an error message is written to the log file. If the event is forwarded in "confirmed" mode, an acknowledgment file stored as test_dir/test.ack is returned.

invokeid n

This command causes a next request to be sent with an invocation identifier of n.

mode c[onfirmed]

This command causes subsequent Set, Action, or EventReport requests to be sent in confirmed mode. Confirmed mode is the default mode.

mode u[nconfirmed]

This command causes subsequent Set, Action, or EventReport requests to be sent in unconfirmed mode.

pair test[post]

This command sends a test request, and then awaits both a confirmation reply (stored in result_dir/test.cnf) and a notification (stored in result_dir/test.ntf). This paired response is typical of System Management Function 1 behavior in which M-CREATE, M-SET, and M-DELETE operations result in both a confirmation reply and either an object-creation, attribute-value-changed, or object-deletion notification. The confirmation and notification files may be compared with expected result files stored as test_dir/test.exp and test_dir/test.ntf_exp, respectively.

receive test[post]

This command receives a confirmation and stores it in the file result_dir/test.cnf. The corresponding expected result file is test_dir/test.exp. Any asynchronous notifications that arrive while ovatrun is awaiting a confirmation are stored as are regular tests.

sent test

This command issues a request as does a regular test, but does not wait for a reply.

timeout n

This command sets the number of seconds to wait for a reply before a test is aborted and an error message is written to the log file.

All commands may be implemented using a test command language (TCL).

After all test commands have been issued, and responses have been stored, any line in a response file beginning with "currentTime" is removed. Current results 120 are then compared with expected results 124 (if available), and a summary report is prepared in a log file 126. If specialized postprocessing is required, the optional field "post" that appears following a test name will be invoked in lieu of the default "simple comparison" rules.

B. Structure

In general, the test execution engine comprises two modules, ovatrun and atrun. Ovatrun is the shell script driver for the atrun executable.

The test execution engine may be launched by issuing a command of the following syntax:

ovatrun [-i] [-t test_dir] [-r result_dir] [-b batch_list] [-l log] [-E efd] [-e env] [-s session] [-p per_dir] [-v] [-h] [-a]

The command line options are further defined as follows:

-a

By default, test output is removed after it is compared with expected values. When the -a option is given, the raw response files are retained in an archive.

-b batch_list

The -b option may be used to name an alternative batch list file to read from when executing network agent tests. The default batch list file is test_dir/batch_list. This -b option is ignored when in interactive (-i) mode.

-c

This option allows manual connection management. The user is now responsible for sending the ACSE AARQ request, AARE release, and ABRT abort connection management requests.

-E efd

The -e option names a file (the event forwarding discriminator (EFD) file) that is sent to the event management system before test execution begins. The file is a request of type CreateRequest that sets up an EFD to cause appropriate notifications to be forwarded to the atrun executable module.

-e env

Before test execution begins, the environment startup file named by this option is "sourced" by the current shell. This provides a way to set customized shell variables for use with "!" shell escape commands.

-h

The -h option is trivial, and merely prints a help (or usage) message.

-i

The -i option signifies interactive mode. In this mode, test commands are read from stdin rather than the batch list file, and output is written to stdout. No comparison is made with expected results, nor are log files written. Typing 'q', 'Q', 'quit', or 'Quit' exits interactive mode.

-l log

The results of non-interactive testing are written to a log file, which may be optionally specified using the -l option. If this option is not given, the log file will be written in the directory log in the result_dir directory given by the -r option. The log file's name will be constructed from the date and time an ovatrun command is issued. If the verbose option is given (-v, below), a timestamp is written to the log as each test request is sent, and an elapsed time indicating the time delay between the sending of a request and the receipt of a reply is recorded. After all tests have been issued, the replies are compared with expected values and a PASS/FAIL message printed is printed to the log. A summary of the number of tests executed, passed, and failed may be printed from the log.

-p per_dir

The -p option indicates a persistence file directory (i.e., a directory containing the compiled definitions of the ASN.1 types used by generated tests). By default, the persistence file directory is test_dir/per. .Per files are created automatically by the ovatgen tool.

-r result_dir

The -r option indicates a results directory. The hierarchies of this directory mirror the hierarchies of the test_dir, and contain corresponding output files.

-s session

The -s option names a file that contains the ASN.1 definition of the Session presentation address and title. By default, a communications session with the HP OpenView Postmaster is established, and all message routing is handled by the Object Registration Services within the Postmaster daemon. If a direct connection to a specific agent is required instead, this option allows one to specify that connection.

-t test_dir

The -t option indicates the directory in which generated test files are saved. All test names in the batch_list are prefixed by this directory name. This directory is also the default location of the batch_list, the Efd.req files, and the per file directory. The default value for test_dir is the current directory.

-v

The -v option allows written to information to be written to the log file as tests are being executed. For example, a timestamp is written to the log as each test request is sent, and an elapsed time is recorded which indicates the time delay between the sending of a request and the receipt of a reply.

After the ovatrun command is issued, the ovatrun module parses command line options. If the -i option is not found, the contents of the test_dir/batch_list file are parsed, and a directory structure for receiving reply files is created in result_dir. The ovatrun module then calls the atrun executable module.

A preferred code flow for the atrun executable is given in FIG. 27, and begins with the heading main.

Upon launching the atrun executable, command line options are parsed once again, and a number of startup routines are invoked before entering the main_loop of the atrun executable.

A first of the startup routines invoked is find_root. This routine applies heuristics to find and return the root of a test directory (which by default is test_dir). It is in this directory where startup files are likely to be found. If a test directory is specified with the -t option, the directory following the -t option takes precedence, and the application of heuristics is avoided. Otherwise, heuristics are applied searching from the current working directory upward, until a directory containing a subdirectory called per is found. The only input to this routine is tst_dir, the name of the test directory (if any) following the ovatrun -t option.

A second startup routine invoked is load_per. This routine loads the persistence files (.per files) created by ovatgen. If the -p option is given with ovatrun, the files in per_dir_ name (the directory designated by the per_dir argument following the -p option of ovatrun) are opened. If the -p option is not given, an attempt is made to open root_dir/per/gdmo.per (where root_dir is the root of the test tree identified by find_root). As a last resort, primitives are loaded from /usr/OV/gdmo.mibs/ovat.per (the HP OpenView persistence file primitive library).

Persistence files comprise compiled definitions of ASN.1 types, and are used to encode requests (and decode responses) sent over a telecommunications management network. Persistence files may be derived from an ASN.1 definition library such as the DTD (Data Type Dictionary) library which forms a part of the commercially available HP OpenView Distributed Management Platform, the ISODE (International Standards Organization Developer's Environment) library, or similar library. In FIG. 27, function calls used in accessing the Hewlett Packard DTD library are noted.

A third startup routine invoked by the atrun executable is initialize_com. This routine initiates a BMP (BER (Basic Encoding Rules) Management Protocol) library connection by optionally encoding a session object and calling bmp_bind (a BMP function which establishes an association with an agent to be tested). BMP functions are summarized in the "HP OpenView Integration Series Distributed Management Developer's Reference for HP 9000 Series and Sun Systems" at p.1-39–1-57. The initialize_com routine also initializes the primitive_US array (to make it more efficient to locate what kind of primitives need to be passed on to bmp_send (another BMP function). Inputs to the function are: root—the test directory root located by find_root, which is a likely location for the default session object; and session_option—the argument following the -s option of ovatrun, which names an explicit session object to be encoded.

A last startup routine invoked by the atrun module is efd_startup. This routine sends a request to the ovead agent (an HP OpenView agent) to create an Event Forwarding Discriminator (EFD) so that desired network events are forwarded to the atrun module. If desired, the location of an EFD request file can be given explicitly with the ovatrun -E option. However if the location of a specific EFD request file is not provided, an attempt is made to send the default file EFD.req (located in the root of the test directory). If a request file is found, a CreateResult confirmation will be stored to result_dir/EFD.cnf. Inputs to this function are: test_root—the test directory root located by find_root, which is a likely location for an EFD file; and Efd_name—the argument following the -E option of ovatrun, which names an explicit EFD file.

After calling the above startup routines, the atrun module enters its main_loop. In the main_loop, commands of the batch_list file are successively read, decoded, and dispatched to an agent under test. The only input to the main_loop is test_file, the name of the batch_list file 112 from which commands will be dispatched.

A first function of main_loop is get_line. In batch mode, this function simply returns the next command line from stdin. In interactive mode, the function reads a command line using a ksh-like history buffer, and checks for a user input quit command. The inputs to this function are: fd—a file descriptor indicating a file to read from (when in batch mode); buf—a pointer to the buffer into which a new command line is written; and maxlen—the size of the buffer into which a new command line is being written. If no more commands exist, the function merely returns an empty buffer (buf).

The function parse_test is used to parse a new command line and return its corresponding command code. The function also sets a pointer (arg) to point to the first character of a command line following the returned command. Inputs to this function are: line—a pointer to the command line to be parsed; and arg—a pointer to the character in a line following the line's command.

The function parse_args is used to parse the arguments of a shell escape command (i.e., !) and fill an array of argument pointers for use by the commonly available UNIX command exec( ). The function obeys quotes for grouping multi-word arguments. The only input to the function is args, a string to be filled with argument pointers. The function returns a pointer to the filled args array.

Prior to sending a command, or receiving a response, the build_name function assembles the components of an input or output filename from the inputs "prefix" (a string to prepend to a test name), "test" (a pointer to the beginning of the test name) and "suffix" (a string to append to the test name). For example, prior to sending a test request, this function is called with the test_dir name, a pointer to an individual test name, and the suffix ".req". Prior to receiving a response, this function is called with the result_dir name, a pointer to an individual test name, and the suffix ".cnf". The test name is extracted from the batch_list file by the parse_test function (i.e., pointed to by the arg pointer returned by parse_test). However, if an extracted test name begins with a '/', it is treated as an absolute path name and a prefix is not added. After assembling a filename, the function returns a pointer to the constructed name.

Tests are sent to an agent via the send_file function. This function sends the next test request in req_fd file, where req_fd is a file descriptor of the test request to be sent (i.e. the filename constructed by build_name). After parsing an object in the req_fd file, it is encoded into a BER string, and sent with bmp_send( ). The pointer prim_ret is set to point to the primitive sent. If a request is successfully sent, the function returns TRUE.

The function peek_eof is a subroutine of send_file which looks ahead in a request file to see if there is anything other than whitespace or ASN.1 comments remaining in the request file. If nothing but whitespace and/or ASN.1 comments remains, the function returns TRUE (signaling an end-of-file (EOF)). Otherwise, the function returns FALSE. The only input to the function is fd, the file descriptor of the file from which ASN.1 requests are being read.

A subroutine of peek_eof, isasn1comment, looks ahead in a request file to see if an ASN.1 comment is followed by a valid token beginning a new request (in which case DTD_parse, a DTD library function, may be called). This look ahead subroutine avoids the setting of a DTD_parse error flag when a comment at the end of a request file leads the program to believe that another request follows, when in fact it does not. Inputs to this function are: c—the current lookahead character; and fd—the file descriptor of the file from which ASN.1 requests are being read. The function returns TRUE if a "--" ASN.1 comment is followed by a request, and otherwise returns FALSE.

Get_primitive is a subroutine of send_file which returns a BMP primitive number corresponding to the ASN.1 type in the DTD object. It performs a linear search of the array of primitive type names, using the DTD Unique String pointers (so that each string comparison is a simple pointer check). The only input to the function is dtd_req, the DTD object to be sent. If found, the function returns a primitive number. Otherwise the function returns a -1.

A final function of the atrun module's main_loop is receive_file. This function receives a confirmation, notification, or both. Non-null file descriptors indicate which type is expected. The commands REGULAR, RECEIVE, and PAIR set cnf_fd, into which confirmation and invocation messages are sent. EVENT and PAIR set ntf_fd, into which notifications are written. Unexpected messages (a notification when only a confirmation is expected, or a confirmation when only an event is expected) are saved in sequentially numbered files in result_dir/event as /#.ntf and /#.cnf, respectively. Inputs to this function are: cnf_fd—the confirmation file; ntf_fd—the notification file; and ack_fd—a confirmed-mode reply file.

After all commands in a test have been sent, the atrun executable returns control to the ovatrun module. At this point, and if running in batch mode, ovatrun compares results stored in result_dir with expected results stored in test_dir with the .exp extension.

IV. Expected Results Installer

The expected results installer merely saves known-good result files as expected result files. In this manner, the test execution engine may compare the results of additional test runs with expected results.

The expected results installer may be launched by issuing a command of the following syntax:

ovatexp [-f test_list] [-t test_dir] [-r results_dir]

The command line options are further defined as follows:
-f test_list

The -b option specifies a test_list file comprising the names of all tests to be executed. This list controls which result files will be saved as expected result files. By default, the location of the test_list is test_dir/batch_list.
-r results_dir The -r option specifies a test results directory from which known-good test results can be copied.
-t test_dir The -t option specifies a directory into which known-good test results can be copied.

In use, tests will typically be run in interactive mode so that the result of each test sent to an agent may be individually verified. After all results have been verified, the tests will be executed in batch mode, and results will be saved in a results directory (result_dir). These results may then be copied to a directory of known-good results (test_dir) using the ovatexp command.

The awk language is used to parse test_list files and extract the names of test files (i.e., blank lines and comments are skipped, and either the first field of a regular test is returned, or the second field of a "pair", "receive", or "event" command is returned). Thereafter, the test names are used to locate source files, and create destination file names (i.e., .cnf ->.exp, and .ntf ->.ntf_exp). If the first line of a source file contains a valid CMIS response type name (e.g., CreteResult, GetResult, . . . ), any line beginning with "currentTime" is removed before copying the file to its corresponding destination file. If the first line of a source file does not contain a valid CMIS response type name, the file is copied as is into its corresponding destination file.

By deleting "currentTime", a test will not fail due to differences in test execution times. These lines are also ignored by the test execution engine when comparing current results with expected results.

While illustrative and presently preferred embodiments of the invention have been described in detail herein, it is to be understood that the inventive concepts may be otherwise variously embodied and employed and that the appended claims are intended to be construed to include such variations except insofar as limited by the prior art.

What is claimed is:

1. Apparatus for testing a telecommunications management network agent's functionality outside of a run-time network environment, the apparatus comprising:

a) one or more computer readable storage mediums; and b) computer readable program code stored in the one or more computer readable storage mediums, the computer readable program code comprising:
  i) code for building an internal containment tree which mirrors a run-time containment tree of the telecommunications management network agent, wherein the internal containment tree comprises a number of nodes corresponding to managed objects in the run-time containment tree;
  ii) code for generating functional tests corresponding to each node of the internal containment tree; and
  iii) code for executing the tests via the telecommunications management network agent.

2. Apparatus as in claim 1, wherein the code for building an internal containment tree comprises code for building an internal containment tree in response to a name of a containment tree specification file designated in a test generation command line.

3. Apparatus as in claim 2, wherein the code for building an internal containment tree in response to a name of a containment tree specification file is configured to read a containment tree specification file in the form of a text outline, wherein each line of text comprising the outline:
  a) identifies an instance of a managed object class which is to comprise part of an agent's run-time containment tree; and
  b) begins with one or more characters indicating a managed object class instance's nesting level within an agent's run-time containment tree.

4. Apparatus as in claim 3, wherein the code for building an internal containment tree in response to a name of a containment tree specification file comprises code for:
  a) parsing each line of the named containment tree specification file for a managed object class name;
  b) identifying each managed object class name found as the name of a subordinate managed object class;
  c) using the nesting level indications of the named containment tree specification file to identify the name of a managed object class which is immediately superior to a subordinate managed object class; and
  d) parsing documents comprising a telecommunications management network interface to locate a name binding template which connects corresponding superior and subordinate managed object classes.

5. Apparatus as in claim 4, wherein the code for locating a name binding template comprises code for:
  a) generating lists of superclasses for corresponding superior and subordinate managed object classes; and
  b) identifying a name binding template which connects the superior and subordinate managed object classes, wherein the code for identifying a name binding template checks cross-products of two corresponding lists of superclasses.

6. Apparatus as in claim 4, wherein the code for building an internal containment tree in response to a name of a containment tree specification file comprises code for:
  a) parsing each line of the named containment tree specification file for a distinguishing attribute name; and
  b) using a distinguishing attribute name, in addition to a subordinate managed object class name found in a same line of the named containment tree specification file, to locate a name binding template.

7. Apparatus as in claim 6, wherein the code for building an internal containment tree in response to a name of a containment tree specification file comprises:

a) code for generating a default value for each distinguishing attribute name found in a line of the named containment tree specification file; and
b) code for:
  i) locating a distinguishing attribute name for each managed object class name of the named containment tree specification file for which a distinguishing attribute name is not provided; and
  ii) generating a default value for same.

8. Apparatus as in claim 7, wherein the code for generating default values for distinguishing attribute names generates default values which adhere to ASN.1 subtypes.

9. Apparatus as in claim 3, wherein each line of text comprising the named containment tree specification file comprises fields for providing a managed object class name, an optional directory name, an optional distinguishing attribute name, and an optional value for the distinguishing attribute name, wherein:
  a) the code for generating tests creates a directory structure in which tests may be stored;
  b) the directory structure mirrors an agent's run-time containment tree;
  c) each subdirectory of the directory structure corresponds to a node of the internal containment tree; and
  d) the optional directory name provided in a line of text comprising the named containment tree specification file serves as a default name for a subdirectory corresponding to a managed object class instance identified by that line.

10. Apparatus as in claim 9, wherein the code for generating tests creates a UNIX directory structure in which tests may be stored.

11. Apparatus as in claim 1, wherein the code for building an internal containment tree comprises code for:
  a) building an internal containment tree directly from documents defining a telecommunications management network interface; and
  b) printing the constructed internal containment tree to an editable file;
  wherein the editable file may later be consumed by the code for building an internal containment tree.

12. Apparatus as in claim 11, wherein the code for building an internal containment tree directly from documents defining a telecommunications management network interface comprises code for reading in a GDMO model.

13. Apparatus as in claim 12, wherein the code for building an internal containment tree directly from documents defining a telecommunications management network interface is responsive to a managed object class selection list designated in a test generation command line.

14. Apparatus as in claim 1, wherein:
  a) the code for generating tests creates a directory structure in which tests may be stored;
  b) the directory structure mirrors the telecommunications management network agent's run-time containment tree; and
  c) each sub-directory of the directory structure corresponds to a node of the internal containment tree.

15. Apparatus as in claim 14, wherein the directory structure created by the code for generating tests is a UNIX directory structure.

16. Apparatus as in claim 1, wherein the code for executing tests incorporates a test command language implementing a shell escape mechanism, wherein the shell escape mechanism allows for external processing or synchronization with the telecommunications management network agent as tests are being executed.

17. Apparatus as in claim 1, wherein the code for executing tests incorporates a test command language implementing a pair command, wherein the pair command sends a test request, and then awaits both a confirmation reply and a notification.

18. Apparatus as in claim 1, wherein the code for generating tests is compiled independently of the code for executing tests, and the code for executing tests is driven by data output from the code for generating tests.

19. A computer implemented method for testing a telecommunications management network agent's functionality outside of a run-time network environment, the method comprising:

a) building an internal containment tree comprising a computerized data structure of linked nodes which correspond to and mirror managed objects of the telecommunications management network agent's run-time containment tree;

b) generating functional tests corresponding to each node of the internal containment tree; and c) executing the tests by encoding them and sending them over a telecommunications channel to the telecommunications management network agent under test.

* * * * *

UNITED STATES PATENT AND TRADEMARK OFFICE
CERTIFICATE OF CORRECTION

PATENT NO.   : 5,850,511
DATED        : December 15, 1998
INVENTOR(S)  : Paul Stoecker et al.

It is certified that error appears in the above-identified patent and that said Letters Patent is hereby corrected as shown below:

Column 5,
Line 49, delete "[no-X721]" and insert therefor -- [noX721] --

Column 13,
Line 55, delete "$pr_{-type-}value$" and insert therefor -- pr_type_value --

Signed and Sealed this

Eleventh Day of June, 2002

Attest:

JAMES E. ROGAN
Attesting Officer    Director of the United States Patent and Trademark Office